(12) United States Patent
Augustyn

(10) Patent No.: US 11,277,378 B2
(45) Date of Patent: *Mar. 15, 2022

(54) NETWORK COMMUNICATION METHOD AND APPARATUS

(71) Applicant: Waldemar Augustyn, Redondo Beach, CA (US)

(72) Inventor: Waldemar Augustyn, Redondo Beach, CA (US)

(*) Notice: Subject to any disclaimer, the term of this patent is extended or adjusted under 35 U.S.C. 154(b) by 35 days.

This patent is subject to a terminal disclaimer.

(21) Appl. No.: 16/923,319

(22) Filed: Jul. 8, 2020

(65) Prior Publication Data

US 2020/0344207 A1    Oct. 29, 2020

Related U.S. Application Data

(63) Continuation of application No. 15/645,853, filed on Jul. 10, 2017, now Pat. No. 10,749,840.
(Continued)

(51) Int. Cl.
*H04L 61/2503* (2022.01)
*H04L 61/4511* (2022.01)
(Continued)

(52) U.S. Cl.
CPC .......... *H04L 61/2503* (2013.01); *G06F 16/21* (2019.01); *G06F 16/22* (2019.01);
(Continued)

(58) Field of Classification Search
CPC ............. H04L 61/2503; H04L 61/1511; H04L 61/6086; H04L 12/66; G06F 16/21; G06F 16/22; G06F 16/2379
See application file for complete search history.

(56) References Cited

U.S. PATENT DOCUMENTS 6,055,236 A   4/2000  Nessett et al.
6,421,732 B1  7/2002  Alkhatib et al.
(Continued)

FOREIGN PATENT DOCUMENTS

CN   101277309    7/2012
CN   102821165   12/2012
(Continued)

OTHER PUBLICATIONS https://en.wikipedia.org/wiki/Network_interface.
(Continued)

*Primary Examiner* — James R Sheleheda
(74) *Attorney, Agent, or Firm* — Ellenoff Grossman & Schole LLP; James M. Smedley; Alex Korona

(57) ABSTRACT

Devices residing in different networks communicate with one another using inter-network communication. A host may transmit a first packet to a gateway and the gateway may transform it into a second packet. When creating the second packet, the gateway may transmit a request to an address mapper for a mapped address. The mapped address includes a native address or a system address. The system address includes another native address as well as a reference value. The reference value is associated with the host, includes an opaque binary value of an arbitrary size, and is subdivided into multiple fields associated with the host. In response to the mapped address being the system address, the address mapping engine obtains the system address. In response to the mapped address being the native address, the address mapping engine obtains the native address. The native address is determined in view of an existing network protocol.

48 Claims, 13 Drawing Sheets

Related U.S. Application Data

(60) Provisional application No. 62/359,827, filed on Jul. 8, 2016.

(51) Int. Cl.
  *G06F 16/23* (2019.01)
  *H04L 12/66* (2006.01)
  *G06F 16/21* (2019.01)
  *G06F 16/22* (2019.01)
  *H04L 101/686* (2022.01)

(52) U.S. Cl.
  CPC .......... *G06F 16/2379* (2019.01); *H04L 12/66* (2013.01); *H04L 61/1511* (2013.01); *H04L 61/6086* (2013.01)

(56) References Cited

U.S. PATENT DOCUMENTS

| | | | |
|---|---|---|---|
| 6,430,623 | B1 | 8/2002 | Alkhatib |
| 7,047,314 | B2 * | 5/2006 | Sato ................. H04L 29/12009 370/352 |
| 7,106,739 | B2 | 9/2006 | Beier |
| 7,139,828 | B2 | 11/2006 | Alkhatib et al. |
| 7,366,188 | B2 | 4/2008 | Kim |
| 7,406,526 | B2 | 7/2008 | Benchetrit et al. |
| 7,450,560 | B1 | 11/2008 | Grabelsky et al. |
| 7,609,701 | B2 | 10/2009 | Yang et al. |
| 8,234,408 | B2 | 7/2012 | Jungck |
| 8,451,845 | B2 | 5/2013 | Boucadir et al. |
| 8,842,531 | B2 | 9/2014 | Shigeeda et al. |
| 9,531,766 | B2 | 12/2016 | Young et al. |
| 9,628,294 | B1 | 4/2017 | Brandwine et al. |
| 10,749,840 | B2 * | 8/2020 | Augustyn ............... G06F 16/21 |
| 2002/0087721 | A1 | 7/2002 | Sato et al. |
| 2003/0074466 | A1 | 4/2003 | Hughes et al. |
| 2005/0041675 | A1 | 2/2005 | Trostle et al. |
| 2005/0066035 | A1 | 3/2005 | Williams et al. |
| 2006/0179480 | A1 | 8/2006 | Jardin et al. |
| 2006/0274749 | A1 | 12/2006 | Beier |
| 2007/0127474 | A1 | 6/2007 | Mirtorabi et al. |
| 2010/0046517 | A1 * | 2/2010 | Chida ................. H04L 61/2514 370/392 |
| 2010/0235481 | A1 | 9/2010 | Deutsch et al. |
| 2011/0110375 | A1 | 5/2011 | Boucadair et al. |
| 2013/0201999 | A1 | 8/2013 | Savolainen et al. |
| 2016/0072763 | A1 | 3/2016 | Short et al. |
| 2018/0343146 | A1 | 11/2018 | Dunbar et al. |
| 2019/0075344 | A1 | 3/2019 | Brown |
| 2019/0132251 | A1 * | 5/2019 | Dao .................... H04L 61/2007 |

FOREIGN PATENT DOCUMENTS

| | | |
|---|---|---|
| WO | 2002015014 | 7/2001 |
| WO | 2002065713 | 8/2002 |

OTHER PUBLICATIONS https://docs.oracle.com/javase/tutorial/networking/nifs/definition.html.
https://en.wikipedia.org/wiki/OSI_model.
https://www.wireshark.org/docs/wsug_html_chunked/ChAdvNameResolutionSection.html.
https://www.ibm.com/support/knowledgecenter/en/STCMML8/com.ibm.storage.ts3500.doc/ppg_3584_IPv4_IPv6_addresses.html.
https://en.wikipedia.org/wiki/Domain_Name_System.
https://www.webopedia.com/TERM/A/AP.html.
https://searchmobilecomputing.techtarget.com/definition/access-point.
https://en.wikipedia.org/wiki/Node_(computer_science).
hittps://en.wikipedia.org/wiki/Node_(networking).
https://www.webopedia.com/TERM/G/gateway.html.
https://en.wikipedia.org/wiki/Gateway_(telecommunications).
https://mashable.com/2011/02/03/ipv4-ipv6-guide/#vZWsY3g2kOqL.

* cited by examiner

NETWORK COMMUNICATION METHOD AND APPARATUS

CROSS-REFERENCE TO RELATED APPLICATION

This application is a Continuation of U.S. Non-provisional application Ser. No. 15/645,853, filed on Jul. 10, 2017, which claims benefit of priority to U.S. Provisional Patent Application No. 62/359,827, filed Jul. 8, 2016, each of which are hereby expressly herein incorporated by reference in their entirety.

TECHNICAL FIELD

This disclosure relates to network communication using an addressing schema, and more particularly to Internet protocol (IP) network communication using an addressing schema to establish communications between devices in private networks.

BACKGROUND

Devices may communicate with other devices via public and/or private networks. A public network, such as the Internet, may be accessible by devices, regardless of where the device resides. A private network allows devices that reside within the private network to securely communicate with one another via intra-net communication. A device within one private network may establish inter-net communication (that is, communicate with another device residing in a different network than the one it resides in) with another, remote device.

A private network may include a host and a gateway. In a private network, a host may be assigned a unique native address that may be secretive within the private network and used only by other devices within that private network. Within the private network, different hosts communicate to each other using their native addresses. The native addresses are opaque to others residing outside of the private network.

A gateway or edge router, which connects a private network to a public network such as the Internet, is assigned a unique, or potentially more than one, public address. The public address is globally visible. Therefore, the public address has meaning within a public network and may be utilized by other devices to communicate with the gateway. Devices within different private networks communicate with each other, via the public network, using public addresses. A public address of a gateway may also be associated with the hosts that reside in the same private network as the gateway.

In order for a first host located in a first private network to communicate with a second host located in a second private network (where the second private network is different than the first private network), a tunnel such as virtual private network (VPN) may be used.

SUMMARY

The following presents a simplified summary of various aspects of this disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the present disclosure, an address mapper receives a request for a mapped address. The mapped address includes one of a native address or a system address. The system address includes another native address and a reference value. The reference value is associated with a host. The reference value includes an opaque binary value of an arbitrary size, and the reference value is subdivided into plurality of fields associated with the host. An address mapping engine obtains the mapped address. In response to the mapped address being the system address, the address mapping engine obtains the system address. In response to the mapped address being the native address, the address mapping engine obtains the native address. The native address is determined in view of an existing network protocol.

In another aspect of the present disclosure, an address mapping system is described. The address mapping system includes an address mapping engine and a gateway. The address mapping engine includes multiple mappings of respective input addresses to respective output addresses. The gateway includes a packet processing that communicates with the address mapping engine with respect to output addresses. The gateway replaces an input address with an output address. The output address includes one of a native address, a translated native address or a system address.

Computing devices for performing the operations of the above described method and the various implementations described herein are disclosed. Computer-readable storage media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings, in which.

DETAILED DESCRIPTION

Aspects and implementations of the present disclosure are directed to network communications, especially inter-network communications, using an addressing schema. A method, system and apparatus for such network communications is described. Traditionally, in order for a first device residing in a first network to communicate with a second device residing in a second network, inter-network communication is established. Typically, the first device sends data in the form of one or more packets to a first gateway (also residing in the first network) to transmit to a second gateway (residing in the second network), via a third network. The second gateway then transmits the data to the second device. The first and second networks may be independent, private networks and may establish communication between residing devices via a public network. The third network may be a public network.

Devices located in a private network may communicate with each other using one another's native addresses (e.g., addresses that may be locally assigned to hosts within a private network). An example of a native address is an Internet Protocol (IP) address. A native address of a host may not be globally reachable by other devices from outside the private network. Therefore, hosts within a private network may not be able communicate directly with hosts outside the private network. Some examples of such networks include: private business networks, internal government networks, home networks, or any networks isolated for operational, security, or any other reasons.

As networks expand and grow, inter-network communication may become less secure. Furthermore, native addresses of various devices may be represented by different formats, and various networks and/or devices may be incompatible with others, which may lead to further difficulty in inter-network communication.

Implementations of the disclosure address the above deficiencies by allowing collaboration between devices residing in different networks (such as private networks). Networks may include additional devices such as address mappers and DNS query interceptors that provide system addresses that are mapped to native addresses. By using the mappings, communication may be established between two or more hosts residing on incompatible networks, networks running custom protocols, or networks with non-standard characteristics such as classified networks, space networks, etc. The present disclosure allows third party entities, such as corporations, universities, government agencies, etc., to securely engage in inter-network communication without creating dedicated VPN networks.

Various aspects of the above referenced methods and systems are described in details herein below by way of examples, rather than by way of limitation.

Figure 1A:
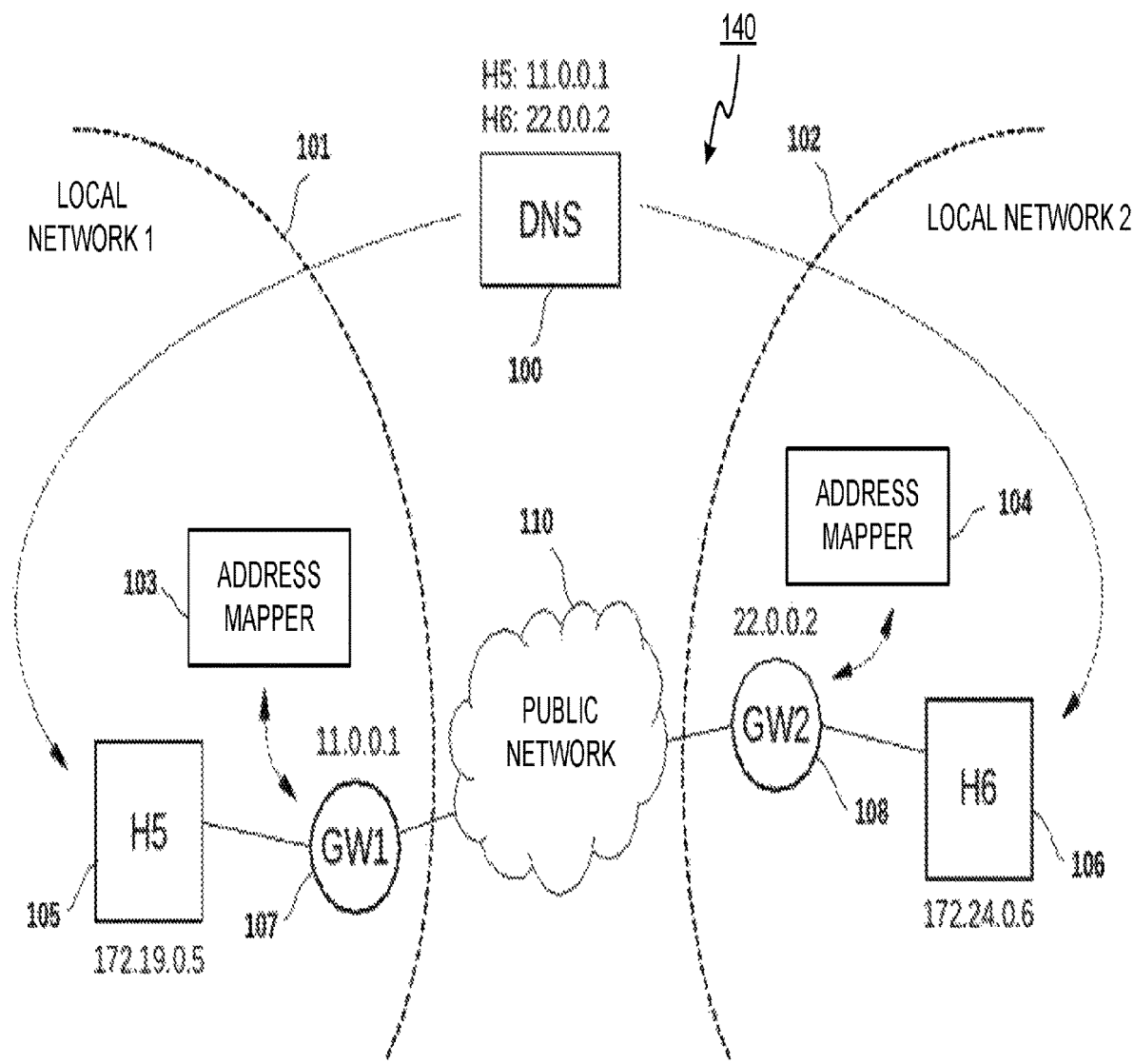
FIG. 1A is a block diagram illustrating a networking system of prior art, in accordance with an implementation of the disclosure.

FIG. 1A is a block diagram 140 illustrating a networking system of prior art. Block diagram 140 depicts a local network 1 (101), a domain name system (DNS) 100, a public network 110, and a local network 2 (102). Local network 1 (101) includes an address mapper 103, a host 5 (H5) (105) and a gateway 1 (GW1) (107). Local network 2 (102) includes an address mapper 104, a gateway 2 (GW2) (108) and a host 6 (H6) (106). In block diagram 140, network address translation (NAT) may be utilized to map an IP address to a modified address when packets are routed. The components in block diagram 140 may use native addresses and modified addresses of hosts during communication.

As depicted, an address of host 5 (105) is 172.17.0.5; an address of gateway 1 (107) is 11.0.0.1; an address of gateway 2 (108) is 22.0.0.2; and address of host 6 (106) is 172.24.0.6. These addresses may be referred to as respective native addresses of the devices. DNS maps an address of host 5 to gateway 1 (107)'s address: 11.0.0.1 and an address of host 6 (106) to gateway 2 (108)'s address: 22.0.0.2. Gateway 1 (107)'s address and gateway 2 (108)'s address are public addresses, which are visible and reachable by other local networks (not depicted) that have access to public network 110. The public addresses are globally unique within public network 110.

Gateway 1 (107) and gateway 2 (108) may also be referred to as NAT routers or edge routers. Gateway 1 (107) and gateway 2 (108) may translate addresses of local hosts, host 5 (105) and host 6 (106), respectively, to their own public addresses or potentially to one of the public addresses from an available pool of addresses. Address mapper 103 and address mapper 104 may perform the function of such translation.

Suppose that host 5 (105), residing within local network 1 (101), wishes to communicate with host 6 (106), residing within local network 2 (102). Host 5 (105) may transmit data to host 6 (106) using a packet or multiple packets. A packet may include, among other things, a header and payload. The header may include an address identifying a source of the packet (e.g., an address of host 5 (105)) and an address identifying a destination of the packet (e.g., an address of the host 6 (106)). The packet may be transmitted by host 5 (105) to host 6 (106), via gateway 1 (107) and gateway 2 (108). As depicted, gateway 1 (107) communicates with gateway 2 (108) via public network 110. Details regarding changes to the packet header during transmission are depicted herein with respect to FIG. 1B.

Figure 1B:
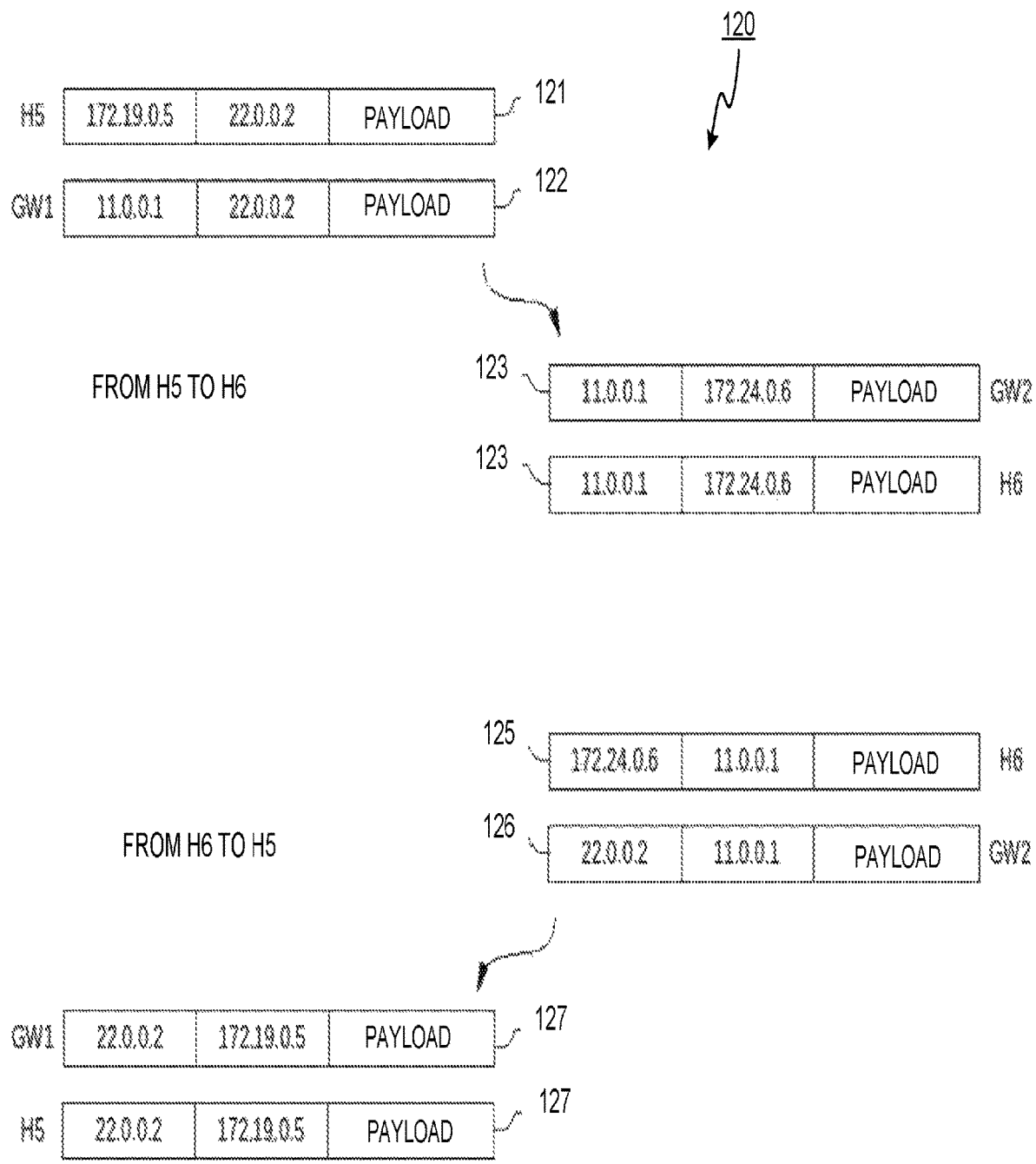
FIG. 1B illustrates packet flow of prior art, in accordance with an implementation of the disclosure.

FIG. 1B illustrates packet flow 120 of prior art. The top portion of FIG. 1B illustrates packet header details with respect to transmission of a packet from host 5 (105) to host 6 (106). The bottom portion of FIG. 1B illustrates packet header details with respect to transmission of a packet from host 6 (106) to host 5 (105). Packet 121 is a packet originating from host 5 (105). Host 5 (105) inserts its own address (172.19.0.5) into a portion of the header and an address of host 6 (106) into another portion of the header. Host 5 (105) acquires the address of host 6 (106) (i.e., 22.0.0.2) from DNS 100 (depicted in FIG. 1A). DNS, after receiving a request from host 5 (105) for host 6 (106)'s address, returns an address of host 6 (106) as the address of host 6 (106)'s gateway, gateway 2 (108). Host 5 (105) may then transmit the packet to gateway 1 (107). Thus, packet 121 transmitted by host 5 (105) to gateway 1 (107) contains a source address: 172.19.0.5 and a destination address: 22.0.02.

When packet 121 arrives at gateway 1 (107), gateway 1 (107) transforms it into packet 122. In packet 122, gateway 1 (107) changes the source address to its address (e.g., 11.0.0.1) but does not change the destination address. Gateway 1 (107) may then transmit the packet to gateway 2 (108) (via public network 110). Thus, packet 122 transmitted by gateway 1 (107) contains a source address: 11.0.0.1 and a destination address: 22.0.0.2.

After transmission over public network 110, packet 122 arrives at gateway 2 (108). Gateway 2 (108) creates packet 123 which translates the destination address to the native address of host 6 (106). Gateway 2 (108) does not change the source address. Gateway 2 (108) may then transmit packet 123 to host 6 (106). Thus, packet 123 transmitted by gateway 2 (108) to host 6 (106) contains a source address: 11.0.0.1 and a destination address: 172.24.0.6.

Packet 123 arrives at host 6 (106) and no further changes to addresses are made. Thus, an application running on host 6 (106) receives packet containing a source address: 11.0.0.1 and a destination address: 172.24.0.6.

When host 6 (106) wishes to transmit a response to the packet to host 5 (105), host 6 (106) creates a packet 125. Host 6 (106) inserts its own address (172.24.0.6) into a portion of the header and an address of host 5 (105) into another portion of the header. Since host 6 (106) responds to a packet received from host 5 (105), host 6 (106) does not need to query DNS 100 because it already has host 5 (105)'s address. If an application on host 6 (106) wished to originate communication with host 5 (105), host 6 (106) would query DNS 100, similarly to the way host 5 (105) did. Once host 6 (106) acquires the address of host 5 (105), it may then transmit the packet to gateway 2 (108). Thus, packet 125 transmitted by host 6 (106) to gateway 2 (108) contains a source address: 172.24.0.6 and a destination address: 11.0.0.1.

When packet 125 arrives at gateway 2 (108), gateway 2 (108) transforms it into packet 126. In packet 126, gateway 2 (108) changes the source address to its address (e.g., 22.0.0.2) but does not change the destination address. Gateway 2 (108) may then transmit the packet to gateway 1 (107) (via public network 110). Thus, packet 126 transmitted by gateway 2 (108) contains a source address: 22.0.0.2 and a destination address: 11.0.0.1.

After transmission over public network 110, packet 126 arrives at gateway 1 (107). Gateway 1 (107) creates packet 127 which translates the destination address to the native address of host 5 (105). Gateway 1 (107) does not change the source address. Gateway 1 (107) may then transmit packet 127 to host 5 (105). Thus, packet 127 transmitted by gateway 1 (107) to host 5 (105) contains a source address: 22.0.0.2 and a destination address: 172.19.0.5.

Packet 127 arrives at host 5 (105) and no further changes to addresses are made. Thus, an application running on host 5 (105) receives packet containing a source address: 22.0.0.2 and a destination address: 172.19.0.5.

Prior art may be limited in that only one local host may be identified with its gateway's address. To remedy such limitation for user datagram protocol (UDP) and transmission control protocol (TCP), hosts may be further identified by not just their gateway addresses but also by port numbers. However, such a remedy supports only a limited number of hosts and limited protocols. Prior art systems may also be limited as they may not allow communication between multiple private networks that may not be compatible with one another and operate using different protocols. The disclosure provides robust solutions that enhance security and allow both compatible and incompatible networks to establish internetwork communications. The present disclosure utilizes a system and method for network communication using an addressing schema which can be used to identify the source address and/or the destination address in a packet.

Figure 2:
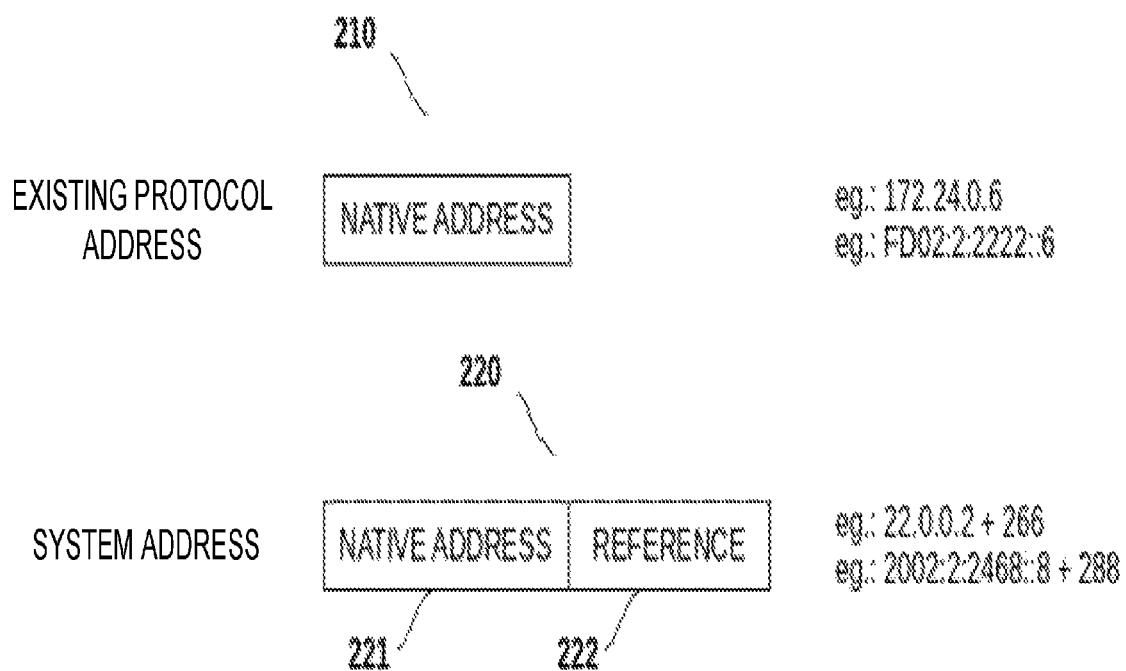
FIG. 2 illustrates an exemplary system address, in accordance with an implementation of the disclosure.

FIG. 2 illustrates an exemplary system address. A native address 210 may be an address associated with a source or a destination identified in a packet. Native address 210 may be an IPv4 address (e.g., 22.0.0.2), an IPv6 address (e.g., 2002:420:2468:2::8), or another address. IPv4 refers to Internet protocol version 4, which is one underlying technology used to enable the Internet. A device accessing the Internet may be assigned a unique, numerical IP address expressed using an IPv4 format. IPv4 address format may be expressed as: x.x.x.x, where "x" is an octet which is a decimal value between 0 and 255. IPv6 refers to the sixth revision to the Internet protocol. It may function similarly to IPv4 in that it may provide the unique, numerical IP addresses for Internet-enabled devices to communicate. IPv4 utilizes 32 bits whereas IPv6 utilizes 128 bits. Native address 210 may be an address of a source address or a destination address included in a packet. Suppose for example that a first host wishes to transmit data to a second host. The first host may transmit the data via one or more packets. In an implementation, a packet may include, among other things, a header and payload. The header may include a source address identifying a source of the packet (e.g., an address of the first host) and a destination address identifying a destination of the packet (e.g., an address of the second host).

A system address 220 includes a native address 221, i.e. an address in the format of an existing network protocol supported by a local gateway, and a reference 222. Native address 221 is also an address of an existing protocol but it is not necessarily the same as address 210. It may be a different native protocol address, e.g. IPv4 vs IPv6, and it may have a different value. Reference 222 is a value, such as an arbitrary value, that may be included with either or both source and destination addresses contained in a packet. A reference may be calculated using an algorithm or an arbitrary value that is associated with native address and is subject to mapping, transformations, or other calculations to produce a system address recognized by a particular networking system. The reference may be provided in every packet and can be included with either or both source and destination addresses. In an example, as depicted by FIG. 2, reference 222 has a numerical value of "266" in the IPv4 compatible address and "288" in the IPv6 compatible address. In the depiction, the notation of the system address uses a "+" symbol to separate a native address 221 from reference 222. In other notations, system address may be depicted using other symbols or means of association.

In an implementation, the value of the references may be determined by a device such as an address mapper or a host (or another device) and may include a lookup, an explicit configuration, or a random assignment. The address mappers may assign reference value and hosts and gateways may use them. The address mappers may allocate reference values based on information acquired from the gateways, query interceptors, its own stored data, and/or the configuration. The address mappers may use arbitrary algorithms in the process of allocating references. The address mappers may use configuration directly, where the values of the references would be pre-assigned by a system administrator. The address mappers may alternatively use a dynamic lookup where the values of the references would be looked up in a table that may change periodically. The address mappers may further use a random selection from a pool of references. Alternatively, the address mappers may use any other algorithm that produces a valid reference.

In an implementation, a reference may be interpretable within and have a meaning within the local network in which the origination host resides. A reference may be an opaque binary value to other networks outside of a host's local or originating network. An opaque value may not be transparent or interpretable by other networks. In an implementation, a portion of the reference may be assigned to facilitate system operations. In one example, the system address may include an explicit null reference. The explicit null reference may indicate that a gateway should interpret a native address portion of the system address directly without consulting address mappers. In another example, a network administrator may deliberately assign meanings to otherwise opaque references and convey that meaning to other networks (e.g., reference 1000 could indicate hosts with a website representing the network).

Figure 3:
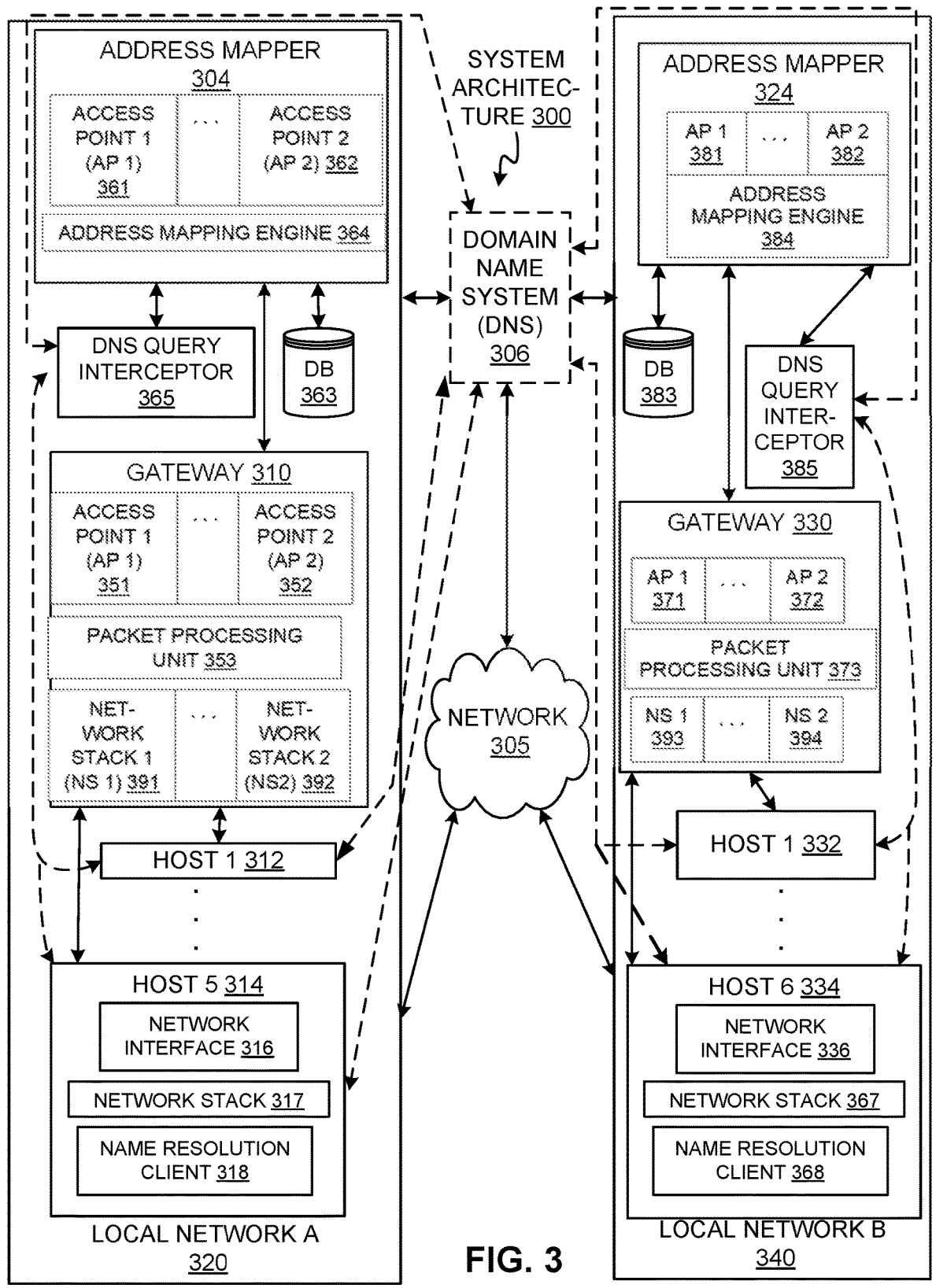
FIG. 3 illustrates an exemplary system architecture for providing system addresses to facilitate network communications, in accordance with an implementation of the disclosure.

FIG. 3 illustrates an exemplary system architecture 300 for providing system addresses to facilitate network communications. System architecture 300 includes a local network A 320, DNS 306, a network 305, and a local network B 340. In an implementation, DNS 306 (depicted by a block outlined in dashed lines) may be an optional component of system architecture 300. Local network A 320 includes an address mapper 304, a database (DB) 363 (or data store or storage system), a DNS query interceptor 365, a gateway 310, and multiple hosts including host 1 (312), . . . , host 5 (314). Address mapper 304 includes access point (AP) 1 (361), . . . , access point 2 (362), and an address mapping engine 364. Gateway 310 includes access point (AP) 1 (351), . . . , access point 2 (352), network stack 1 (391), . . , network stack 2 (392), and a packet processing unit 353. Host 1 (312), . . . , host 5 (314) each include a network interface 316, a network stack 317, and a name resolution client 318.

Local network B (340) includes an address mapper 324, a database (DB) 383, A DNS query interceptor 385, a gateway 330 and multiple hosts including host 1 (332), . . . , host 6 (334). Address mapper 324 includes access point (AP) 1 (381), . . . , access point 2 (382), and an address mapping engine 384. Gateway 330 includes access point (AP) 1 (371), . . . , access point 2 (372), network stack 1 (393), . . . , network stack 2 (394), and a packet processing unit 373. Host 1 (332), . . . , host 6 (334) includes a network interface 336, a network stack 367, and a name resolution client 368.

The term "database" as used herein, refers to any form of one or more (or combination of) relational databases, object-oriented databases, hierarchical databases, network databases, non-relational (e.g., NoSQL) databases, key-value stores, document store databases, in-memory databases, programs, tables, files, lists, or any form of programming structure or structures that function to store data as described herein.

Although the depicted implementation in FIG. 3 depicts hosts 1 (312), host 5 (314), host 1 (332), and host 6 (334), in other implementations, fewer or greater number of hosts than depicted may be utilized. Additionally, although FIG. 3 depicts access point 1 (351), access point 1 (361), access point 1 (371), access point 1 (381), access point 2 (352), access point 2 (362), access point 2 (372), and access point 2 (382), in other implementations, fewer or greater number of access points than depicted may be utilized. Furthermore, although FIG. 3 depicts network stack 1 (391), network stack 2 (392), network stack 1 (393), and network stack 2 (394), in other implementations, fewer or greater number of network stacks than depicted may be utilized.

In one implementation, network 305 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

A private network may include multiple devices (also referred to as components) such as hosts, switches, hubs, bridges, routers, and gateways that may directly communicate with each other without having to communicably couple to a public network. Gateways may connect devices within one private network to devices within another private network via a public network. A public network (such as the Internet) refers to a network system where devices may be reached directly via their native address. A public network may utilize a global uniqueness of addresses assigned to devices and connect devices to other devices via the globally unique address. Addresses assigned to devices within a private network may be unique within that particular private network. Therefore, private networks may utilize their own addressing schema and a device may be assigned an address that is unique within that particular private network. In an implementation, it may be possible for a first device in a first network to have an assigned address that is unique within the first network and a second device in a second network to have the same assigned address which is unique within the second network.

In one implementation, DNS 306 may be a hierarchical decentralized naming system for computers, services, or other resources connected to the public network such as the Internet or a private network. DNS 306 may associate address information assigned to each of the hosts participating in internetwork communications or delegate the responsibility of assigning names of hosts or domain names and mapping of the names to numerical native addresses associated with the hosts. A domain name may be an identification string that defines a realm of administrative autonomy, authority or control within the Internet, or a part of a network address that identifies it as belonging to a particular domain. A host name may refer to a name assigned to a host. A domain name or a host name may be human readable and a host may not use the domain name or the host name for direct communication. The domain name or the host name may be translated to a numerical native address using a name resolution system such as DNS 306. A name resolution system may refer to a system that allows to translate host names into native addresses. Additionally, DNS 306 may include a name resolution protocol in which Internet domain names may be located by searching a database (either internal or external to DNS 306) and translated into Internet Protocol (IP) addresses. Internet domain names are text-based identifiers used to label an Internet resource (a personal computer, a server computing hosting a website, networks, services, etc.). DNS 306 may further convert names associated with hosts to IP addresses, and vice-versa. In one implementation, DNS 306 may list references along with associated native addresses in a database (not depicted). DNS 306 may work with an existing domain name system by either introducing another record type or by using a free form record type such as text strings. A record is a database entry that may contain one or more values. In one implementation, DNS 306 may be one or more computing devices (e.g., a rackmount server, a server computer, etc.).

In one implementation, address mapper 304 and/or address mapper 324 may include dedicated hardware or a software in one or more computing devices (e.g., a personal computer, a laptop, a rackmount server, a server computer, etc.). A user (such as a system administrator) may wish to input commands into address mapper 304 and/or address mapper 324. In one implementation, address mapper 304 and/or address mapper 324 may provide a user interface which allows for user input. The user interface may allow interaction between users and a computer system. The user interface may accept user input via input devices (e.g., mouse, keyboard, etc.) and may include a display device (e.g., monitor) for displaying results of the interaction between users and the computer system.

In one implementation, address mapper 304 and/or address mapper 324 may perform various address mapping, or host name resolution mapping. Address mapping is associating a native address of a host with a native address and a reference value. For example, a native address of IPv4 address 192.168.0.1 may map to 10.0.0.1+1. Host name resolution mapping refers to associating a host name with a native address, and/or a native address and a reference value. For example, a name associated with a host (e.g., host-1.example.com) may map to 192.168.0.1 and/or 10.0.0.1+1.

In implementations of the disclosure, a "user" may be represented as a single individual. However, other implementations of the disclosure encompass a "user" being an entity controlled by a set of users and/or an automated source.

DNS query interceptor 365 or DNS query interceptor 385 intercept queries for native addresses from hosts that may not understand system addresses, issue system address queries on the hosts' behalf, then request address mapper 304 or address mapper 324, respectively, to translate the responses from DNS 306 to native addresses which are then returned to the hosts. The DNS query interceptors may be DNS caching servers that cache native addresses of hosts captured from prior communications or native addresses of hosts who frequently participate in communications. In depicted implementation of FIG. 3, DNS query interceptor 365 and DNS query interceptor 385 are depicted as being external and communicative with address mapper 304 and address mapper 324, respectively. However, in other implementation (not depicted), DNS query interceptor 365 and DNS query interceptor 385 may be internal to address mapper 304 and address mapper 324, respectively. In further implementations (not depicted), DNS query interceptor 365 and DNS query interceptor 385 may be internal to gateway 310 and gateway 330, respectively. In one implementation (not depicted), DNS query interceptor 365 and DNS query interceptor 385 may be optional components that may be removed or not included within system architecture 300 of FIG. 3.

In one implementation, DNS query interceptor 365 and DNS query interceptor 385 may request naming resolution from DNS 306 and transmit such request naming resolution received from DNS 306 to address mapping engine 364 and address mapping engine 384, respectively. Naming resolution refers to identifying a native address associated with a host name. For example, DNS query interceptor 365 may request resolution of a host's name from DNS 306. In response to receiving a native address of the host from DNS 306, DNS query interceptor 365 may transmit the native address to address mapping engine 364. Address mapping engine 364 may then map the native address with a non-assigned native address. Addressing mapping engine 364 may also store the mapping in database 363.

Although database 363 and database 383 are depicted in FIG. 3 as being external to and communicative with address mapper 304 and address mapper 324, respectively, in other implementations, database 363 and database 383 may be internal to address mapper 304 and address mapper 324.

In one implementation, database 363 and/or database 383 may be a storage system such as a memory, a cache, a drive (e.g., a hard drive), a flash drive, a database system, or another type of component or device capable of storing data.

Database 363 and/or database 383 may be implemented in memory such as a routing table, for example, or as a distributed database with local caching by address mappers. Local caching refers to temporarily storing frequently used data into fast local volatile memories (e.g., random access memory (RAM)). Database 363 and/or database 383 may also include multiple storage components (e.g., multiple drives or multiple databases) that may also span multiple computing devices (e.g., multiple server computers). In one implementation, database 363 and database 383 may store mapped address data and provide the mapped address data to address mapping engine 364 and address mapping engine 384. Mapped address data is information organized via native address mapping, system address mapping, or host naming resolution mapping. For example, mapped address data may be a native address or a system address associated with a host's name, or a host's name associated with a native address or a system address.

In one implementation, access point 1 (351), access point 1 (361), access point 1 (371), access point 1 (381), access point 2 (352), access point 2 (362), access point 2 (372), and access point 2 (382) (hereinafter referred individually, or collectively in any combination as "the access points") may be a networking hardware or a computer software that communicably couple between an entity and a private or a public network. The access points may be a networking hardware or a computer software that acts as a communication hub for users. The access points may connect users to other users within the network, which may be operatively coupled wirelessly or by wires and may serve as the point of interconnection between wireless local area network (WLAN) and a fixed wire local network. The access points may also be coupled to a wired router, switch, or hub via an Ethernet cable, and may project wireless signal to a designated area. In one implementation, access points may be used to couple communicably address mapper 304 and gateway 310 or address mapper 324 and gateway 330.

In one implementation, address mapping engine 364 and/or address mapping engine 384 may be implemented as hardware and/or a software. In one implementation, address mapping engine 364 and/or address mapping engine 384 may perform one or more mappings of native addresses of hosts in a private network and native addresses of hosts outside of the private network. In one implementation, address mapping engine 364 and/or address mapping engine 384 may map a system address of a component (such as a host) to a non-assigned private address. A non-assigned private address may include a native address obtained from a pool of addresses delegated for use on private networks. For example, the private addresses may be RFC1918 addresses. The address mapper may map a system address to public address, in some implementations.

Although the depicted implementation in FIG. 3, gateway 310 and gateway 330 are shown, greater or fewer number of gateways may be utilized. In one implementation, gateway 310 and/or gateway 330 may refer to a networking hardware component that may equip a network node for interfacing with another network that may use different protocols than the network in which the network node resides. A network node refers to either a redistribution point or a communication endpoint. A network node may be a device or data point in a network that have an associated network address. Gateway 310 and/or gateway 330 may include one or more computing devices (e.g., a rackmount server, a server computer, etc.) and/or a computer program that may perform the tasks of a computing device gateway.

A gateway may include devices such as protocol translators, impedance matching devices, rate converters, fault isolators, and/or signal translators which may be used to provide system interoperability. System interoperability refers to a device's ability to communicate and/or interact with other systems (devices, etc.) without requiring additional hardware or software. A gateway may establish mutually acceptable administrative procedures between multiple networks. A gateway may be a computing device that may route the traffic from hosts in a private network to the outside network. A gateway may act as a proxy server and a firewall. A gateway may have direct access to both a public network and a private network.

In one implementation, packet processing unit 353 and/or packet processing unit 373 may be implemented as software and/or a hardware. In one implementation, packet processing unit 353 or packet processing unit 373 may request a system address from address mapper 304 or address mapper 324, respectively, and replace a native address of a host contained in a packet with the system address received from address mapper 304 or address mapper 324. For example, packet processing unit 353 may request, from address mapper 304, a system address of a source address of a packet. Upon receiving the system address from address mapper 304, packet processing unit 353 may replace the native address of the source address with the system address.

In one implementation, packet processing unit 353 and/or packet processing unit 373 may repackage a packet into frames conforming to different protocols in context of mixed networks. Mixed networks may include a first network that utilizes a first protocol, a second network that utilizes a second protocol, and so forth. For example, one network may be an IPv4 network and another network may be an IPv6 network and packet processing unit 353 and/or packet processing unit 373 may repackage the packet into a first packet (conforming to IPv4 protocols) and a second packet (conforming to IPv6 protocols). Therefore, packet processing unit 353 and/or packet processing unit 373 may allow packets to be exchanged among components such as hosts that reside within mixed networks.

Host 1 (312), host 5 (314), host 1 (332) and host 6 (334) (hereinafter referred individually, or collectively in any combination as "the hosts") may each include computing devices such as personal computers (PCs), laptops, mobile phones, smart phones, tablet computers, netbook computers, servers, mainframes, virtual machines, container, networked appliances, etc. In one implementation, the hosts may not have direct access to a public network. In other words, the hosts may utilize a gateway (also referred to as an edge router) to connect to a device outside its private network. The gateway may connect to the device via a public network. In one implementation, the hosts may include input devices (e.g., keyboard and mouse), and display device (e.g., monitor). In one implementation, the hosts may include applications that allow users to view content items, such as images, videos, web pages, documents, files that are stored external to the host (i.e., remote files), etc. For example, the application may be a web browser that can access, retrieve, present, and/or navigate content items (e.g., web pages such as Hyper Text Markup Language (HTML) pages, digital media items, etc.) served by a host outside of a private network. The application may include software which provides input and output of commands to a host, via a user interface. The hosts may render, display, and/or present the content items (e.g., a web page, a remote file, etc.) to a user.

In general, functions described in one implementation as being performed by host 1 (312) may also be performed by any host including host 1 (332), host 5 (314), and/or host 6 (334). In addition, the functionality attributed to a particular component can be performed by different or multiple components operating together.

In one implementation, the hosts may be one or more computing devices (such as a rackmount server, a router computer, a server computer, a virtual machine, a personal computer, a mainframe computer, a laptop computer, a tablet computer, a desktop computer, etc.), data stores (e.g., hard disks, memories, databases), networks, software components, and/or hardware components that may be used to provide a user with access to a network. For example, the hosts may allow a user to transmit, receive, modify, etc., data from other hosts.

In an implementation, suppose that host 5 (314) wishes to transmit a packet to host 6 (334). A packet includes a header and a payload. The header includes a source address portion and a destination address portion. An address identifying a source of the packet (e.g., an address of the host 5 (314)) and an address identifying a destination of the packet (e.g., an address of host 6 (334)) may be inserted into the header by host 5 (314). Host 5 (314) may create a packet and transmit the packet to gateway 310. Gateway 310 may forward the payload of the packet to gateway 330, via network 305. Gateway 330 may then transmit the payload to the destination, host 6 (334). When a packet arrives at a particular component (i.e., a host or a gateway) of system architecture 300, the packet's header may be modified.

Details regarding the packet transmission from host 5 (314) to host 6 (334) are described herein. Additional details are described herein below with respect to additional figures. When host 5 (314) wishes to initiate the transmission of the packet to host 6 (334), host 5 (314) creates a packet by inserting its own address (i.e., a local IP address) into a source address portion of the header and an address of host 6 (334) into a destination address portion of the header. Host 5 (314) may acquire a system address of host 6 (334) from DNS 306. DNS 306, after receiving a request from host 5 (314) for host 6 (334)'s address, returns an address of host 6 (334) as the address of host 6 (334)'s gateway, gateway 330 and a reference value. Host 5 (314) may then transmit the packet to gateway 310.

When the packet arrives at gateway 310, gateway 310 transforms it into a second packet. Gateway 310 does not change the destination address. To obtain the source address to insert into the second packet, gateway 310 creates a request to send to address mapper 304 for the system address of the source (i.e., host 5 (314)). Specifically, packet processing unit 353 of gateway 310 creates the request to send to address mapper 304.

Address mapper 304 receives the request. Specifically, access point 1 (361) of address mapping engine 364 of address mapper 304 receives the request and address mapping engine 364 generates a system address based on information from gateway 310 and information stored in database 363. The database is a type of storage database that stores information such as mappings of system addresses (i.e., native addresses and reference values) to native addresses (such as IP addresses).

The access point of address mapping engine 364 of address mapper 304 transmits system addresses of the hosts to gateway 310.

In an implementation, address mapper 304 may provide the address of the hosts. Gateway 310 may then transmit the second packet to gateway 330 (via network 305).

After transmission over network 305, the second packet arrives at gateway 330. Gateway 330 then creates a third packet which includes a source and destination address. Gateway 330 does not change the source address. To obtain the destination address to insert into the third packet, gateway 330 creates a request to send to address mapper 324 for a native address of the destination (i.e., host 6 (334)). Specifically, a packet processing unit 373 of gateway 330 creates the request to send to address mapper 324.

Address mapper 324 receives the request. Specifically, an access point 381 of address mapping engine 384 of address mapper 324 receives the request and address mapping engine 384 returns the native address based on information from gateway 330 and information stored in the database 383. The database is a type of storage database that stores mappings of system addresses (i.e., native addresses and reference values) and native addresses (such as IP addresses). Access point 1 (361) of address mapping engine 364 of address mapper 304 transmits the native address of host 6 (334) to gate 330.

The third packet arrives at host 6 (334) and no further changes to addresses are made.

Figure 5A:
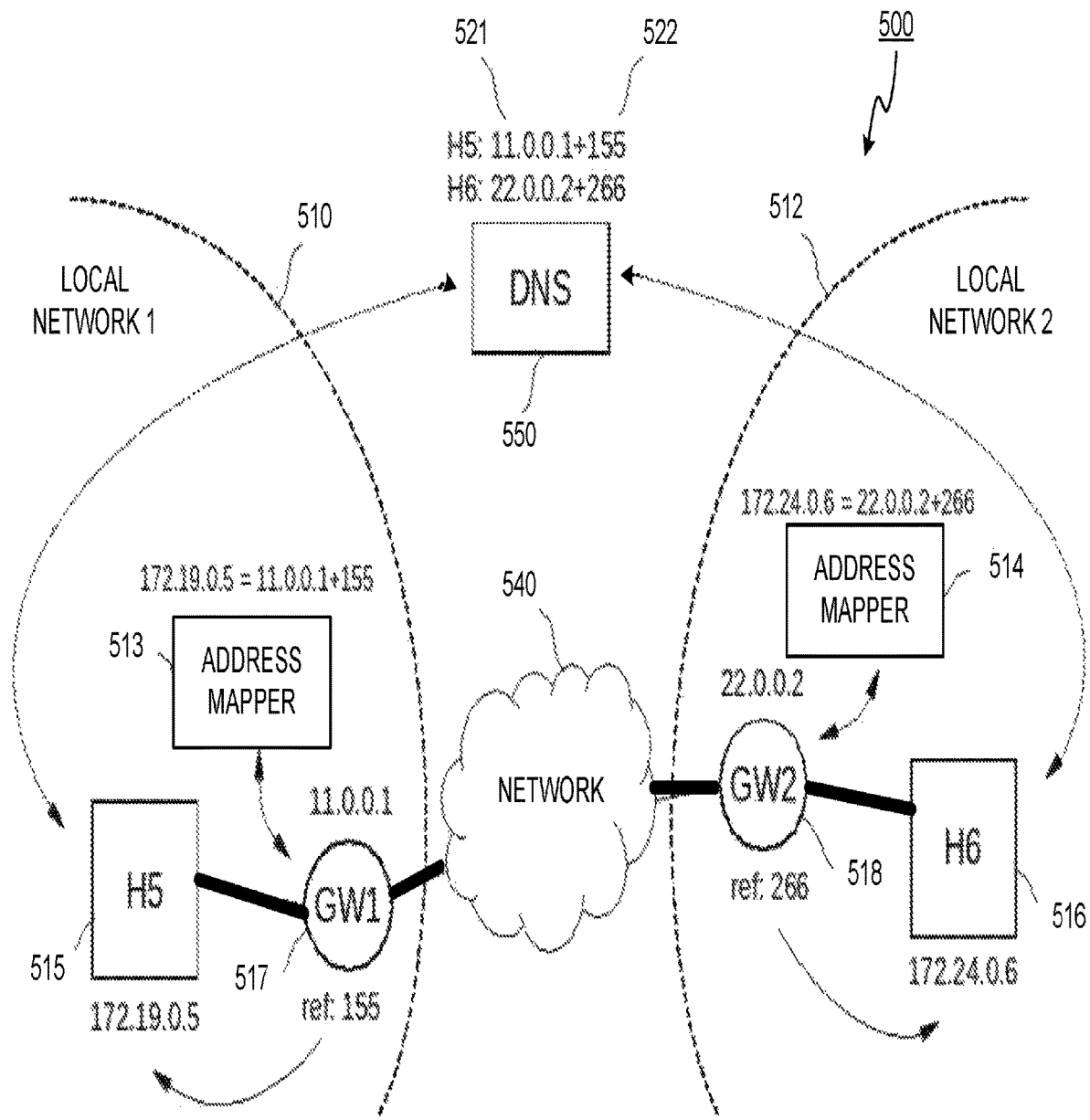
FIG. 5A illustrates a block diagram of a networking system, in accordance with an implementation of the disclosure.
Figure 5B:
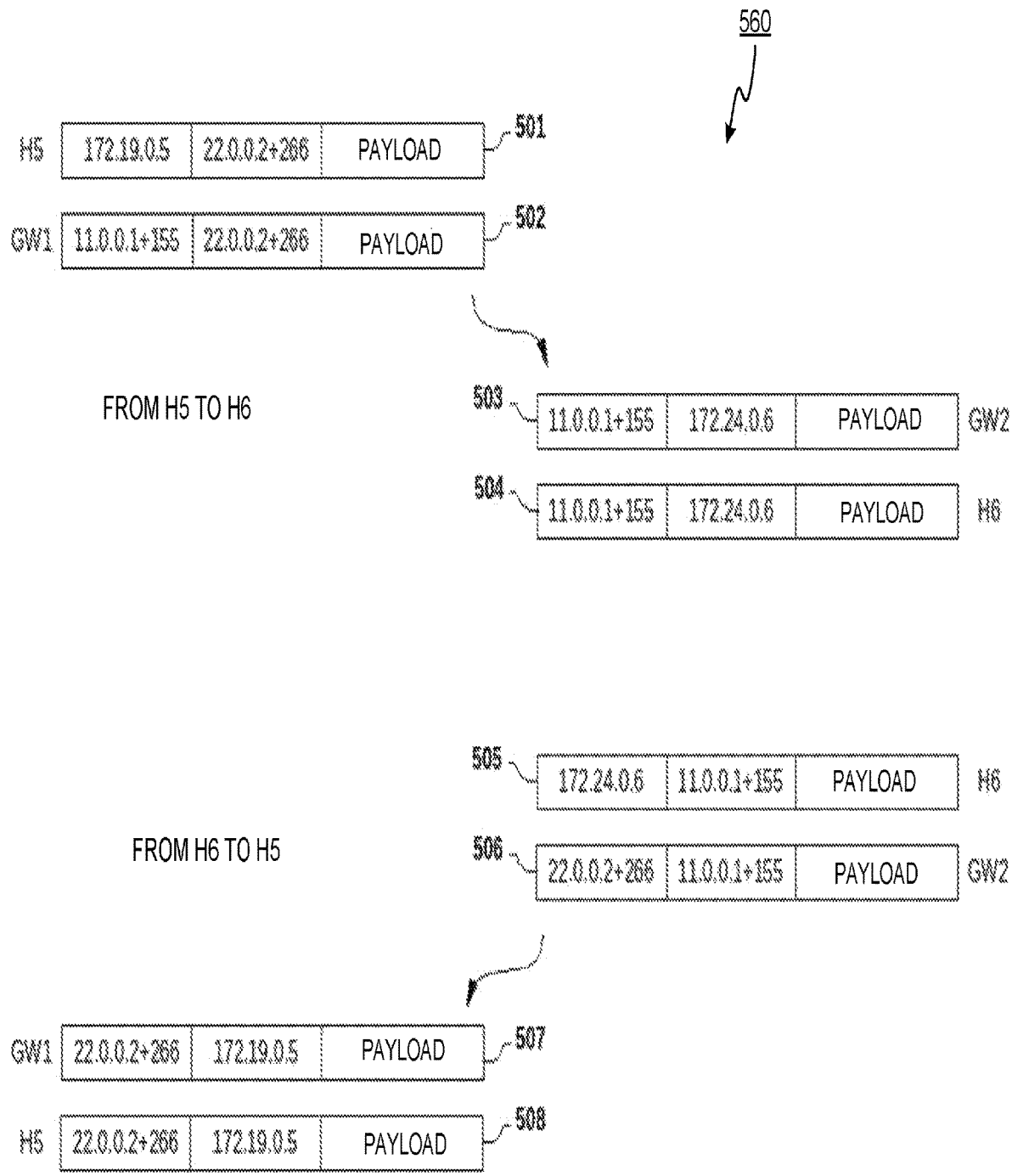
FIG. 5B illustrates packet flow, in accordance with an implementation of the disclosure.

Block diagrams of exemplary systems are provided herein with respect to FIGS. 5A and 5B. In other implementations, DNS interceptors may be employed and examples are described herein with respect to FIGS. 6A and 6B.

In one implementation, network interface 316 and/or network interface 334 may include hardware that provides coupling to a private or a public network (e.g., via an Ethernet card, a network adapter, etc.). In one implementation, network interface 316 and/or network interface 334 may be a system's interface (software and/or hardware) between two pieces of components or protocol layers in a computer network. Network interface 316 and/or network interface 334 may include a network address, a node identification (ID), and a port number associated with the network interface, or a unique reference associated with the network interface.

In one implementation, network stack 317, network stack 367, network stack 1 (NS 1) 391, network stack 2 (NS 2) 392, network stack 1 (NS 1) 393, and/or network stack 2 (NS 2) 394 may be a part of a transmission control protocol/Internet protocol (TCP/IP) model. The TCP/IP model for designing and building a network typically includes at least four layers: the physical and data link layer the network layer, the transport layer, and the application layer. The physical layer portion of the physical and data link layer deals with transmitting raw bits over a communication channel.

The data link portion of physical and data link layer takes the raw transmission and transforms it to be relatively free of transmission errors.

The network layer permits a host to inject packets into a network and have them travel independently to the destination. The protocol used for the network layer on the Internet is called the Internet Protocol (IP). The main function of the network layer is routing packets from a source entity (e.g., host) to a destination entity. In some cases, packets may require multiple hops to make the journey. The network layer (and/or associated software) fray use one or more routing methods for deciding which output line an incoming packet should be transmitted on. In an implementation, any suitable routing method may be used without departing from the spirt and scope of the disclosure.

Although devices that access the Internet each have an associated native address (or IP address), these addresses alone may not be used for transmission of packets because the data link layer may not be able to interpret Internet addresses. Hosts may be attached to a LAN by an interface board that only understands LAN addresses. For example, an Ethernet board may be equipped with a 48 bit Ethernet address. Manufacturers of Ethernet boards request a block of addresses from a central authority to ensure that no two boards have the same address. The transport layer is designed to permit components on the source and destination to engage in communications. With respect to the Internet, two end-to-end protocols may be used. The first protocol, the transmission control protocol (TCP), is a reliable connection-oriented protocol that may allow a byte stream originating on one component to be delivered without error to another component on the Internet. TCP may fragment an incoming byte stream into discrete packets and passes each one to the network layer. At the destination, the receiving TCP process reassembles the received packets into the output stream. TCP may also handle flow control to ensure that a receiving component can handle the flow of incoming packets. The second protocol used in the transport layer on the Internet is user datagram protocol (UDP). UDP is an unreliable connectionless protocol for applications that do not want TCP sequencing or flow control. UDP is used for communications in which prompt delivery is of greater importance than accurate delivery. The transport layer is considered to fall above the network layer in a hierarchical manner to indicate that the network layer provides a service to the transport layer. Similarly, the transport layer falls below the application layer in a hierarchical manner to indicate that the transport layer provides a service to the application layer. The application layer contains high level protocols such as Telnet, file transfer protocol (FTP), electronic mail—simple mail transfer protocol (SMTP), and hypertext transfer protocol (HTTP).

Communication on the Internet may be described as follows. The transport layer may split up a stream of data from the application layer into a number of segments. The network layer, using the Internet protocol, may transport the segments in one or more IP packets from a source to a destination. Each segment may be fragmented into small units as it is transported. When all of the fragmented small units arrive at the destination, they may be reassembled by the network layer into the original segment. This segment may then be handed to the transport layer, which inserts it into the receiving process' (application layer's) input stream.

In one implementation, network stack 1 (391), network stack 2 (392), network stack 1 (393), and network stack 2 (394) may be heterogeneous and may incorporate different network stack models. A network stack model refers to a conceptual model and a set of communications protocols that characterizes the communication functions of a telecommunication or computing system without regard to their underlying internal structure and technology. In one implementation, gateway 310 employs two networks stacks: IPv4 and IPv6 while gateway 330 employs a single IPv4 stack. With this arrangement, local network 320 can be either IPv4 or IPv6 but network 340 must be IPv4 because that's the network stack the gateway supports. Further, network 305 may be a common public network that can be either IPv4 or IPv6 but local network B 340, which is a local network, may only be connected to an IPv4 public network whereas local network A 320 may be connected to either or both IPv4 and IPv6 public networks. Suppose local network A 320 is IPv6. Host 6 (334) on local network B 340 may still communicate with a host 5 (314) residing on the local network A 320. Host 6 (334) may acquire the system address of host 5 (314) as a combination of an IPv4 address of gateway 310 plus a reference. Host 6 (334) may then send the system address of host 5 (314) to its local gateway 330. Gateway 330 may then translate, using address mapper 324, the source's address to a system address and send a packet to gateway 310. Gateway 310 would receive the packet on its IPv4 stack and then translate, using address mapper 304, the destination system address into the local IPv6 address of host 5 (314). Gateway 310 would then detect that it should send the packet to host 5 (314) on the IPv6 stack. Gateway 310 would translate, using address mapper 304, the source's system address to another system address with the native address portion changed to an IPv6 address. Gateway 310 would then create a new IPv6 packet with proper headers and copy the payload to the new IPv6 packet. Gateway 310 would then send the packet to host 5 (314).

In the reverse direction, host 5 (314) would swap source and destination addresses and send an IPv6 packet to gateway 310. Gateway 310, using address mapper 304, would translate both source and destination addresses to system addresses with native address portions changed from IPv6 to IPv4. Gateway 310 would create a new IPv4 packet with those addresses, copy the payload and send it to gateway 330. Gateway 330 would translate the destination system address into local IPv4 address of host 6 (334). Gateway 330 would then send the packet to host 6 (334). If host 5 (314) wanted to originate the communication with host 6 (334), host 5 (314) may acquire host 6's address via DNS query interceptor 365. DNS query interceptor may, using address mapper 304, return a system address with the native address portion mapped to IPv6. Host 5 (314) may then send a packet with this destination address and its own local native address to gateway 310. The packet may then undergo a similar transformation as in the case of responding to a packet from host 6 (334).

In one implementation, name resolution client 318 or name resolution client 368 may be a part of the TCP/IP network layer that provide conversion of a numerical native address to human readable format, and vice versa. For example, name resolution client 318 may convert an IP address to the host name associated with it (e.g., convert the IP address 192.168.0.1 to a host name such as "host-1.example.com" or convert the host name to the IP address 192.168.0.1). Naming resolution may be performed synchronously or asynchronously. In one implementation, name resolution client 318 and/or name resolution client 368 may send a request to a system's host file to resolve naming of a native address. A system's host file may be (or may be in charge of) a locally stored table that includes host names and their respective native addresses. In response to failure of finding a matching entry, name resolution client 318 and name resolution client 368 may ask DNS 306 about the name associated with the address. In one implementation, name resolution client 318 or name resolution client 368 may ask DNS query interceptor 365 or DNS query interceptor 385, respectively, for name resolution. Details regarding DNS query interceptors are described herein below.

Although implementations of the disclosure are discussed in terms of private networks, implementations may also be generally applied to any type of network. Implementations of the disclosure are not limited to private networks that allow communications between hosts located in various networks.

Figure 4A:
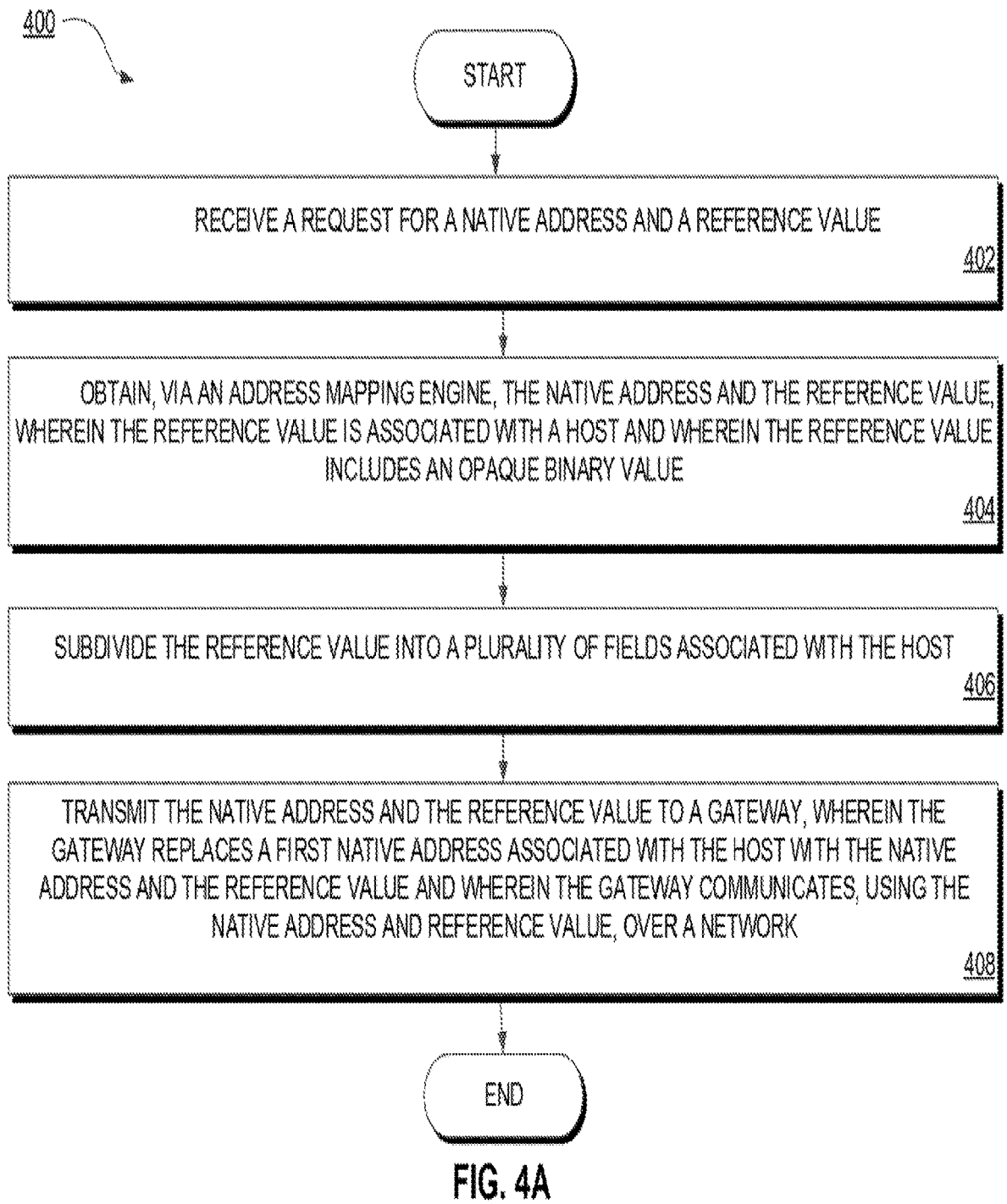
FIG. 4A is a flowchart of a method of providing system addresses, in accordance with an implementation of the disclosure.

Details regarding providing system addresses are described herein with respect to FIG. 4A. FIG. 4A is a flowchart illustrating a method 400 of providing system addresses. Method 400 may be performed by processing logic that includes hardware (e.g., circuitry, dedicated logic, programmable logic, microcode, etc.), software (e.g., instructions run on a processing device to perform hardware simulation), or a combination thereof. In one implementation, method 400 may be performed by address mapper 304 or address mapper 324 as described with respect to FIG. 3. In describing the method 400, reference is made to FIG. 3 to illustrate an implementation. It is noted that the example provided in FIG. 3 is meant for illustrative purposes, and is not to be considered a limiting implementation.

Referring again to FIG. 4A, method 400 begins at block 402 when a request for a native address and a reference value is received. In FIG. 3, address mapper 304 receives a request for a native address and a reference value. The request may be transmitted by a gateway such as gateway 310.

Referring back to FIG. 4A, at block 404, the native address and the reference value are obtained via an address mapping engine. The reference value is associated with a host and the reference value includes an opaque binary value. In FIG. 3, address mapping engine 364 obtains the native address and the reference value. The reference value is associated with host 5 (314).

Referring back to FIG. 4A, at block 406, the reference value is subdivided into multiple fields associated with the host. For example, a reference value may be subdivided into a host identification number, a handshake token, a public key, etc.

An address mapper may divide the reference into one or more fields to aid with calculations, for example, the address mapper may create fields to provide hints for load balance applications, alternative calculation parameters for redundant networks, validation bits, etc. In FIG. 3, address mapper 304 may subdivide the reference.

Referring back to FIG. 4A, at block 408, the native address and the reference value are transmitted to a gateway. The gateway replaces a first native address associated with the host with the native address and the reference value. The gateway communicates, using the native address and the reference value, over a network. As depicted in FIG. 3, address mapper 304 may transmit the system address (including the native address and the reference value) to gateway 310. Gateway 310 may replace a native address associated with host 5 (314) with the native address and the reference value. Gateway 310 communicates, using the native address and the reference value, over network 305.

In an implementation, address mapper 304 maintains a database (e.g., database 363) of respective native addresses mapped to respective system addresses and reference values. The database may be internal or external to address mapper 304. The database may be updated by address mapper 304 after a predetermined amount of time has passed. For example, address mapper 304 may update or reassign native addresses and reference values that are mapped to respective native addresses every hour, every day, etc. In another example, address mapper 304 may periodically update the mapping of native addresses to system address (which include native addresses and reference values) for purposes of security. Therefore, a native address may be associated with a first native address and a first reference value during a first time period and a second native address and a second reference value during a second time period and so on.

In an implementation, a native address may be mapped to a respective system address in one of an IPv4 address or an IPv6 address. The system address may thus include one of an IPv4 address or an IP v6 address. A length of a reference value may include at least 128 bits. For example, a system address of a native address 192.168.0.1 may be 11.0.0.1+

0xFFFF FFFFFFFFFFFFFFFFFFFFFFFFFC. In another implementation, a length of the reference value may be less than 128 bits.

In an implementation, network 305 may be a public network such as the Internet.

Figure 4B:
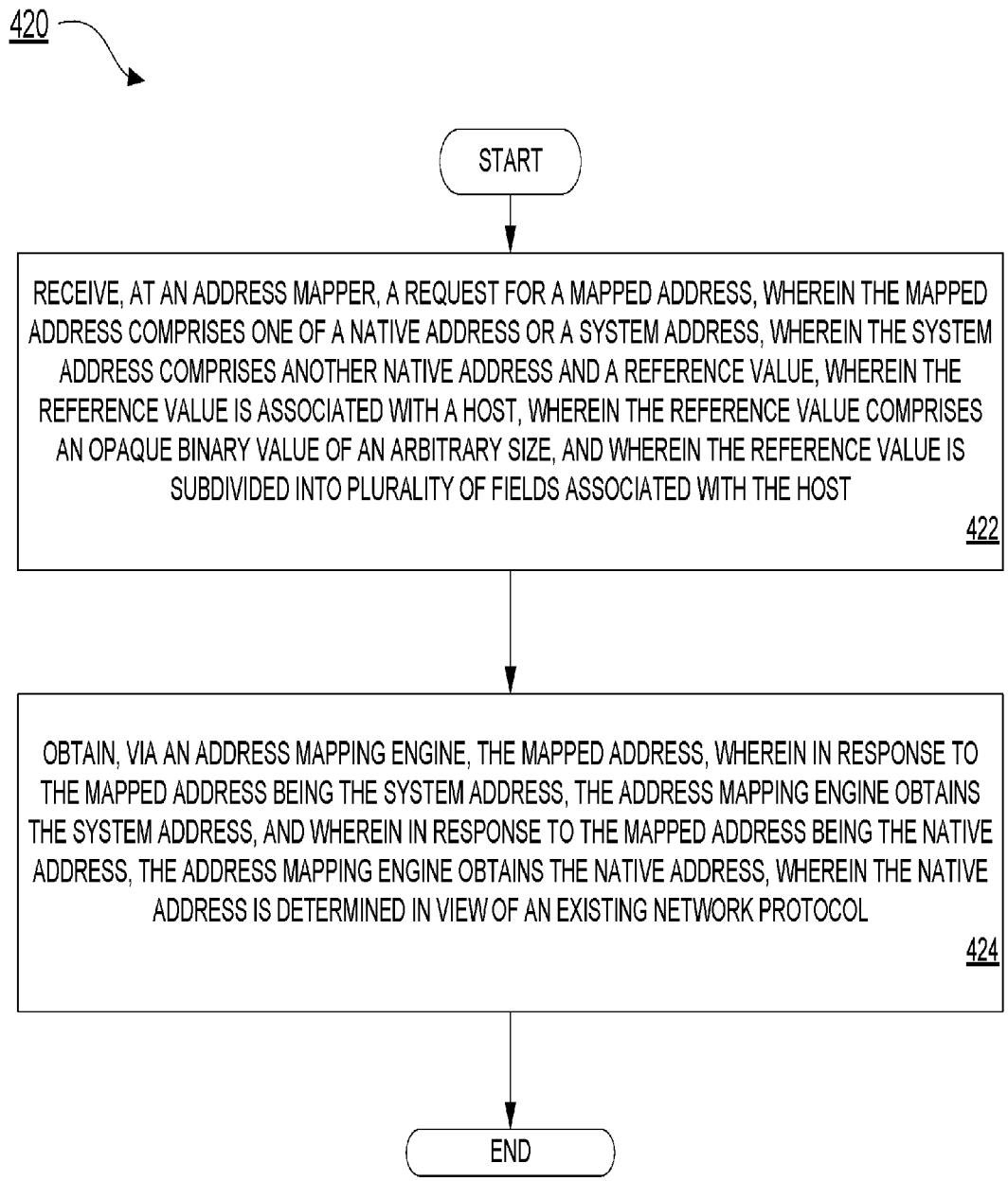
FIG. 4B is a flowchart of a method of providing mapped addresses, in accordance with an implementation of the disclosure.

FIG. 4B is a flowchart of a method 420 of providing mapped addresses. Method 420 may be performed by processing logic that includes hardware (e.g., circuitry, dedicated logic, programmable logic, microcode, etc.), software (e.g., instructions run on a processing device to perform hardware simulation), or a combination thereof. In one implementation, method 420 may be performed by address mapper 304 or address mapper 324 as described with respect to FIG. 3. In describing the method 420, reference is made to FIG. 3 to illustrate an implementation. It is noted that the example provided in FIG. 3 is meant for illustrative purposes, and is not to be considered a limiting implementation.

Referring again to FIG. 4B, method 420 begins at block 422 when a request for a mapped address is received at an address mapper. The mapped address includes one of a native address or a system address. The system address includes another native address and a reference value. The reference value is associated with a host. The reference value includes an opaque binary value of an arbitrary size. The reference value is subdivided into multiple fields associated with the host.

In FIG. 3, address mapper 304 receives a request for a mapped address. The request may be transmitted by gateway 310. The mapped address may be a native address or a system address. The system address includes another native address and a reference value. (See FIG. 2, for example.) The reference value is associated with host 5 (314). Address mapper 304 may subdivide the reference into multiple fields associated with host 5 (314).

Referring again to FIG. 4B, at block 424, the mapped address is obtained via an address mapping engine. In response to the mapped address being the system address, the address mapping engine obtains the system address. In response to the mapped addressed being the native address, the address mapping engine obtains the native address. The native address is determined in view of an existing network protocol. In FIG. 3, address mapping engine 364 obtains the mapped address.

In some implementations, (not depicted), in block 422, the address mapper may also receive a request for a translated network address (described herein below with respect to FIGS. 6A, 68, and 6C).

In an implementation, the mapped address is transmitted to gateway 310 by address mapper 304. Gateway 310 replaces an input address with the mapped address. Gateway 310 communicates, using the mapped address, over network 305. In an implementation, referring to FIG. 3, gateway 310 replaces an input address of host 5 (314), which is 172.19.0.5, with a system address: 11.0.0.1+155.

In an implementation, in FIG. 3 a system address is generated based on information from at least one of gateway 310, DNS query interceptor 365, configuration, or information stored in database 363.

Additional examples of networking systems are described herein with respect to FIGS. 5A, 5B, 6A, 6B, and 6C. Various components depicted in FIGS. 5A, 5B, 6A, 6B, and 6C are similar to those depicted in FIG. 3 and thus, the description presented with respect to the components in FIG. 3 also apply to the components depicted in FIGS. 5A, 5B, 6A, 6B, and 6C.

FIG. 5A is a block diagram 500 illustrating a networking system. Block diagram 500 depicts a local network 1 (510), a DNS 550, a network 540, and a local network 2 (512). Local network 1 (510) includes an address mapper 513, a host 5 (H5) (515) and a gateway 1 (GW1) (517). Local network 2 (512) includes an address mapper 514, a gateway 2 (GW2) (518) and a host 6 (H6) (516).

As depicted, an address of host 5 (515) is 172.17.0.5; an address of gateway 1 (517) is 11.0.0.1; an address of gateway 2 (518) is 22.0.0.2; and address of host 6 (516) is 172.24.0.6. DNS maps hosts to their system addresses. Specifically, DNS 550 maps host 5 to the address: 11.0.0.1+ 155 and host 6 to the address: 22.0.0.2+266. A system address includes a native address as well as a reference (as described in FIG. 2). A native address portion 521 of the system address of host 5 (314) is set to the public address of gateway 1 (517), while a reference 522 is set to 155. The native address portion of the system address of host 6 (516) is set to the public address of gateway 2 (518), while the reference is set to 266.

Suppose that host 5 (515), residing within local network 1 (510), wishes to communicate with host 6 (516), residing within local network 2 (512). Host 5 (515) may transmit data to host 6 (516) using a packet or multiple packets. As described above, a header of a packet may include an address identifying a source of the packet (e.g., an address of host 5 (515)) and an address identifying a destination of the packet (e.g., an address of the host 6 (516)). The packet may be transmitted to gateway 1 (517) from host 5 (515) for transmission to gateway 2 (518) and which then transmits it to host 6 (516). Upon receiving the packet, gateway 1 (517) may translate and replace the source address of the packet to a system address obtained by address mapper 513. The packet may then be transmitted to host 6 (516), via gateway 1 (517) and gateway 2 (518). As depicted, gateway 1 (517) communicates with gateway 2 (518) via network 540. Details regarding changes to the packet header during transmission are depicted herein with respect to FIG. 5B.

FIG. 5B illustrates packet flow 560. The top portion of FIG. 5B illustrates packet header details with respect to transmission of a packet from host 5 (515) to host 6 (516). The bottom portion of FIG. 5B illustrates packet header details with respect to transmission of a packet from host 6 (516) to host 5 (515). Suppose that host 5 (515) wishes to transmit a packet (or multiple packets) to host 6 (516). Specifically, an application such as a software application running on host 5 (515) may wish to transmit a packet 501 to host 6 (516). Packet 501 originating from host 5 (515) includes a packet header and payload.

Host 5 (515) creates packet 501 by inserting its own address (i.e., a local IP address): (172.19.0.5) into a source address portion of the header and an address of host 6 (516) into a destination address portion of the header. Host 5 (515) acquires the system address of host 6 (516) (i.e., 22.0.0.2+ 266) from DNS 550 (depicted in FIG. 5A). DNS 550, after receiving a request from host 5 (515) for host 6 (516)'s address, returns an address of host 6 (516) as the address of host 6 (516)'s gateway, gateway 2 (518) and a reference value of 266. Host 5 (515) may then transmit the packet to gateway 1 (517). Thus, packet 501 transmitted by host 5 (515) to gateway 1 (517) contains a source address: 172.19.0.5 and a destination address: 22.0.02+266.

When packet 501 arrives at gateway 1 (517), gateway 1 (517) transforms it into packet 502. Gateway 1 (517) does not change the destination address. To obtain the source address to insert into packet 502, gateway 1 (517) creates a request to send to address mapper 513 for the system address of the source (i.e., host 5 (515)). Specifically, a packet processing unit (similar to packet processing unit 353 in FIG. 3), not depicted, of gateway 1 (517) creates the request to send to address mapper 513.

Address mapper 513 receives the request. Specifically, an access point (similar to access point 1 (361) depicted in FIG. 3), not depicted, of an address mapping engine (similar to address mapping engine 364 depicted in FIG. 3), not depicted, of address mapper 513 (in FIG. 5A) receives the request and the address mapping engine generates a system address based on information from gateway 517 and information stored in the database (similar to database 363 depicted in FIG. 3). The database is a type of storage database that stores mappings of system addresses (i.e., native addresses and reference values) to native addresses (such as IP addresses) or translated native addresses.

The access point of address mapping engine, not depicted, of address mapper 513 transmits system addresses of the hosts to gateway 1 (517). Address mapper 513, provides to gateway 1 (517), host 5 (515)'s system address: 11.0.0.1+155.

In an implementation, address mapper 513 may provide the address of the hosts in a manner similar to the ones described above with respect to FIG. 4. Gateway 1 (517) may then transmit packet 502 to gateway 2 (518) (via network 540). Thus, packet 502 transmitted by gateway 1 (517) contains a source address: 11.0.0.1+155 and a destination address: 22.0.0.2+266.

After transmission over network 540, packet 502 arrives at gateway 2 (518). Gateway 2 (518) then creates a packet 503 which includes a source and destination address. Gateway 2 (518) does not change the source address. To obtain the destination address to insert into packet 503, gateway 2 (518) creates a request to send to address mapper 514 for a native address of the destination (i.e., host 6 (516)). Specifically, a packet processing unit (similar to packet processing unit 353 in FIG. 3), not depicted, of gateway 2 (518) creates the request to send to address mapper 514.

Address mapper 514 receives the request. Specifically, an access point (similar to access point 1 (361) depicted in FIG. 3), not depicted, of an address mapping engine (similar to address mapping engine 364 depicted in FIG. 3), not depicted, of address mapper 514 (in FIG. 5A) receives the request and the address mapping engine returns a native address based on information from gateway 517 and information stored in the database (similar to database 383 depicted in FIG. 3). The database is a type of storage database that stores mappings of system addresses (i.e., native addresses and reference values), native addresses (such as IP addresses) and/or translated native addresses. The access point of address mapping engine, not depicted, of address mapper 514 transmits the native address of host 6 (516) to gateway 2 (518). Address mapper 514 provides to gateway 2 (518) host 6 (516)'s native address: 172.24.0.6.

Packet 503 arrives at host 6 (516) and no further changes to addresses are made. Thus, an application running on host 6 (516) receives packet 504 containing a source address: 11.0.0.1+155 and a destination address: 172.24.0.6.

When host 6 (516) wishes to transmit a response to the packet to host 5 (515), host 6 (516) creates a packet 505. The application running on host 6 (516) flips or inverts the source address and the destination address of packet 504. Thus, host 6 (516) inserts its own native address: 172.24.0.6 into a source address portion of the header and a system address of host 5 (515) into a destination address portion of the header. host 6 (516) may then transmit the packet to gateway 2 (518). Thus, packet 505 transmitted by host 6 (516) to gateway 2 (518) contains a source address: 172.24.0.6 and a destination address: 11.0.0.1+155.

In another implementation, if host 6 (516) does not obtain the addresses from packet 504, host 6 (516) may obtain the destination's address from DNS 550, in a manner similar to the one described above in relation to packet 501.

When packet 505 arrives at gateway 2 (518), gateway 2 (518) transforms it into packet 506. Gateway 2 (518) does not change the destination address. To obtain the source address to insert into packet 506, gateway 2 (518) creates a request to send to address mapper 514 for the system address of the source (i.e., host 6 (516)). Specifically, a packet processing unit (similar to packet processing unit 353 in FIG. 3), not depicted, of gateway 2 (518) creates the request to send to address mapper 604.

Address mapper 514 receives the request. Specifically, an access point (similar to access point 1 (361) depicted in FIG. 3), not depicted, of an address mapping engine (similar to address mapping engine 364 depicted in FIG. 3), not depicted, of address mapper 514 (in FIG. 5A) receives the request and the address mapping engine generates a system address based on information from gateway 518 and information stored in the database (similar to database 383 depicted in FIG. 3). The database is a type of storage database that stores mappings of system addresses (i.e., native addresses and reference values) to native addresses (such as IP addresses) or translated native addresses.

The access point of address mapping engine, not depicted, of address mapper 514 transmits system addresses of the hosts to gateway 2 (518). Address mapper 514 provides to gateway 2 (518) host 6 (516)'s system address: 22.0.0.2+266.

In an implementation, address mapper 514 may provide the address of the hosts in a manner similar to the ones described above with respect to FIG. 4 and packet 502. Gateway 2 (518) may then transmit packet 506 to gateway 1 (517) (via network 540). Thus, packet 506 transmitted by gateway 2 (518) contains a source address: 22.0.0.2+266 and a destination address: 11.0.0.1+155.

After transmission over network 540, packet 506 arrives at gateway 1 (517). Gateway 1 (517) creates packet 507 which includes a source and destination address. Gateway 1 (517) does not change the source address. To obtain the destination address to insert into packet 507, gateway 1 (517) creates a request to send to address mapper 513 for a native address of the destination (i.e., host 5 (515)). Specifically, a packet processing unit (similar to packet processing unit 353 in FIG. 3), not depicted, of gateway 1 (517) creates the request to send to address mapper 513. Address mapper 513 receives the request. Specifically, an access point (similar to access point 1 (361) depicted in FIG. 3), not depicted, of an address mapping engine (similar to address mapping engine 364 depicted in FIG. 3), not depicted, of address mapper 513 (in FIG. 5A) receives the request and the address mapping engine returns the native address based on information from gateway 517 and information stored in the database (similar to database 363 depicted in FIG. 3). The database is a type of storage database that stores mappings of system addresses (i.e., native addresses and reference values), native addresses (such as IP addresses) and/or translated native addresses.

The access point of address mapping engine, not depicted, of address mapper 513 transmits the native address of host 5 (515) to gateway 1 (517). Address mapper 513 provides to gateway 1 (517) host 5 (515)'s native address: 172.19.0.5.

Packet 507 arrives at host 5 (515) and no further changes to addresses are made to packet 508. Thus, an application running on host 5 (515) receives packet containing a source address: 22.0.0.2+266 and a destination address: 172.19.0.5.

Figure 6A:
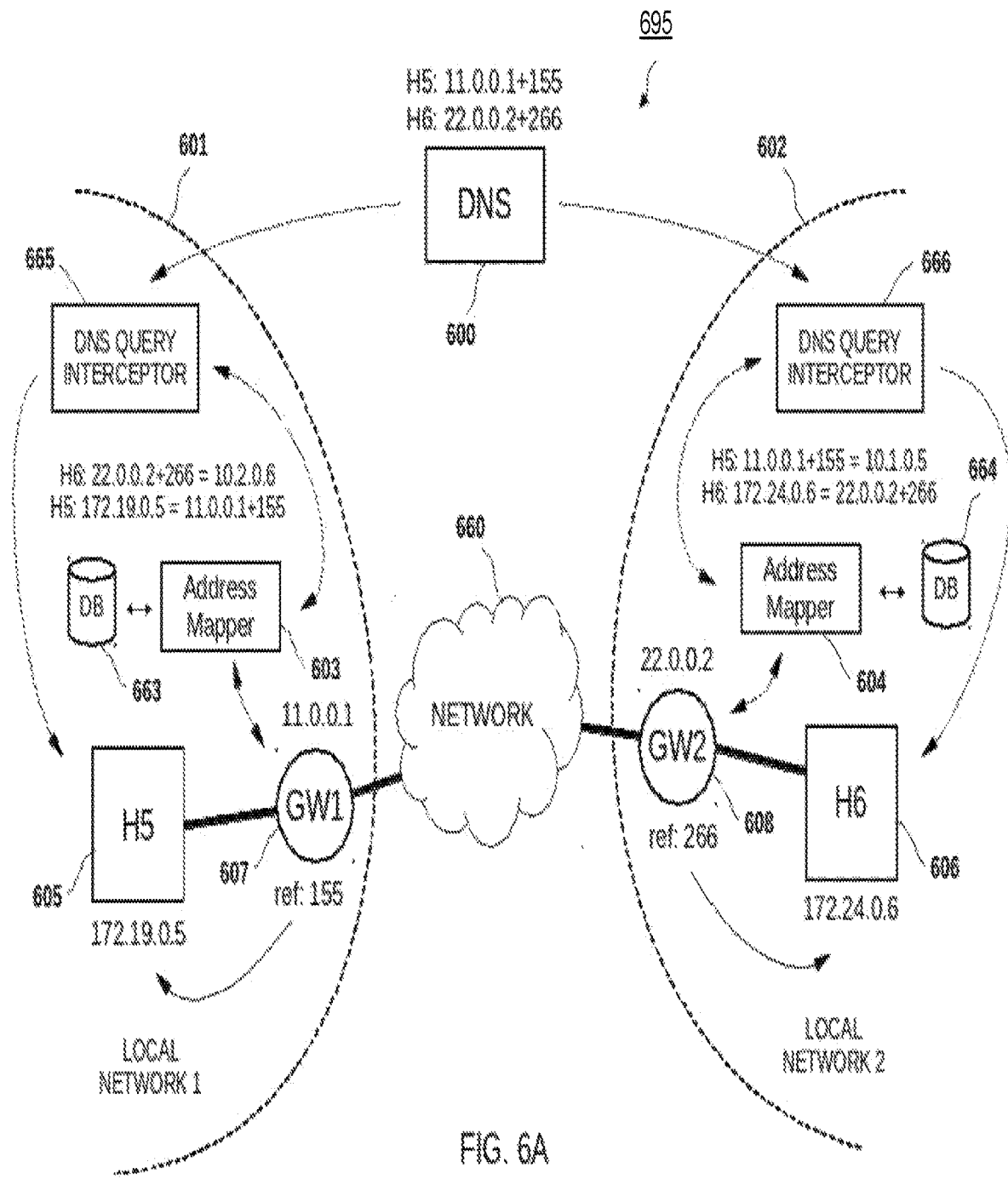
FIG. 6A illustrates a block diagram of a networking system in a compatibility mode, in accordance with an implementation of the disclosure.

In an implementation, the paths that the packets travel are depicted by thick, solid, black lines in FIGS. 5A and 6A.

FIG. 6A is a block diagram 695 illustrating a networking system in a compatibility mode. The block diagram depicts a local network 1 (601), a domain name system (DNS) 600, a network 660, and a local network 2 (602). Local network 1 (601) includes an address mapper 603, a DNS query interceptor 665, a database (DB) 663, a host 5 (H5) (605) and a gateway 1 (GW1) (607). Local network 2 (602) includes an address mapper 604, a DNS query interceptor 666, a database (DB) 664, a gateway 2 (GW2) (608) and a host 6 (H6) (606).

While a system address may be utilized in some examples such as in FIG. 5A, it may not be utilized by all systems due to the fact that hosts, gateways, and/or applications may need to be aware of the system address. The system address may thus be used instead in a compatibility mode where hosts, gateways, and applications may operate in a standard, non-system address manner.

In the block diagram of FIG. 6A, host 5 (605) or host 6 (606) may query DNS query interceptor 665 or DNS query interceptor 666, respectively, for resolving names that refer to system address. The DNS query interceptors may issue queries for system addresses on behalf of hosts, then translate them, using address mappers, into native addresses and return them to the hosts. Address mappers may store or map the translation and provide the system address to the gateways for the destination's address. For example, the system address of host 6 (606) 22.0.0.2+266 obtained by DNS interceptor (665) on behalf of host H5 (605), may be mapped, by address mapper (603), to a translated native address 10.2.0.6, and then returned to host 5(605) as the result of the query. The native address may then be subject to translation back to the system address by a gateway 1 (607). With mapping of a system address to a local native address, neither hosts (host 5 (605) and host 6 (606)) nor applications (not depicted) may not be concerned with a system address. All necessary system address operations may be performed by gateway 1 (607) and gateway 2 (608).

As depicted, an address of host 5 (606) is 172.19.0.5; an address of gateway 1 (607) is 11.0.0.1; an address of gateway 2 (608) is 22.0.0.2; and an address of host 6 (606) is 172.24.0.6. DNS 600 returns the system address of host 5 (605) as: 11.0.0.1+155 and a system address of host 6 (606) as: 22.0.0.2+266.

Suppose that host 5 (605), residing within local network 1 (610), wishes to communicate with host 6 (606), residing within local network 2 (602). Host 5 (605) may transmit data to host 6 (606) using a packet or multiple packets. A packet may include, among other things, a header and payload. The header may include a native address identifying a source of the packet (e.g., an address of the host 5 (605)) and an address identifying a destination of the packet (e.g., a translated native address of host 6 (606) received from DNS query interceptor 665, which intercepted an address of host 6 (606)). The packet may be transmitted to gateway 1 (607) from host 5 (605). Upon receiving the packet, gateway 1 (607) may translate and replace the local source address of the packet to a system address with a help of address mapper 603. The packet may then be transmitted to host 6 (606), via gateway 1 (607) and gateway 2 (608). As depicted, gateway 1 (607) communicates with gateway 2 (608) via network 660. Details regarding changes to the packet header during transmission are depicted herein with respect to FIG. 6B.

Figure 6B:
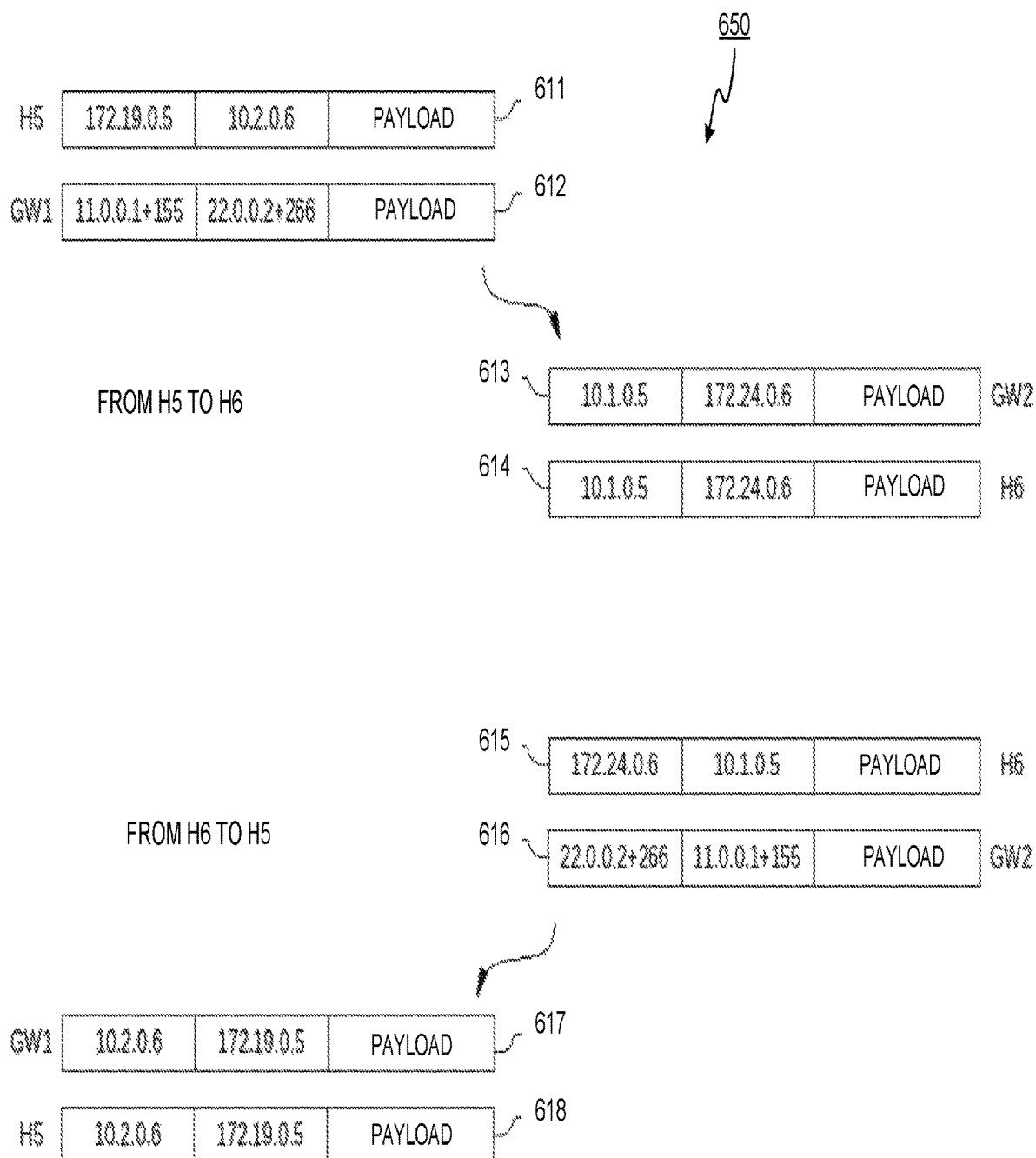
FIG. 6B illustrates packet flow in a compatibility mode, in accordance with an implementation of the disclosure.

FIG. 6B illustrates packet flow 650 in a compatibility mode. The top portion of FIG. 6B illustrates packet header details with respect to transmission of a packet from host 5 (605) to host 6 (606). The bottom portion of FIG. 6B illustrates packet header details with respect to transmission of a packet from host 6 (606) to host 5 (605). Suppose that host 5 (605) wishes to transmit a packet (or multiple packets) to host 6 (606). Specifically, an application such as a software application running on host 5 (605) may wish to transmit a packet 611 to host 6 (606). Packet 611 originating from host 5 (605) includes a packet header and payload. Host 5 (605) creates packet 611 by inserting its own native address (i.e., a local IP address): (172.19.0.5) into source address portion of the header and an address of host 6 (606) into a destination address portion of the header.

To obtain the address of host 6 (606), host 5 (605) transmits a query to DNS query interceptor 665. DNS query interceptor 665 then transmits a request to DNS to obtain an address associated with host 6 (606). The address may be in a form of a system address or a native address. Suppose that the address of host 6 (606) stored within (or otherwise obtained by) DNS 600 is a system address. DNS 600 may transmit the system: 22.0.0.2+266 to DNS query interceptor 665. As described above with respect to FIG. 2, a system address includes native address and a reference. In an implementation, DNS 600 stores (or otherwise accesses and provides) the system address of host 6 (606) as a native address of host 6 (606)'s gateway, gateway 2 (608) along with a reference value of 266.

DNS query interceptor 665, after recognizing that the address associated with host 6 (606) is a system address, transmits the system address to address mapper 603 (depicted in FIG. 6A). In an implementation, DNS query interceptor 665 may recognize a type of a query in order to recognize the address. Address mapper 603 maps the system address of host 6 (606) to a translated native address: 10.2.0.6. A translated native address is an address assigned by an address mapper and may be unused. The translated native address may be utilized within a particular local network.

Address mapper 603 then transmits the translated native address of host 6 (606) to DNS query interceptor 665, and DNS query interceptor 665 transmits the translated native address of host 6 (606) to host 5 (605) and an application running on host 5 (605) creates packet 611, as depicted by FIG. 6B. Host 5 (605) transmits packet 611 to gateway 1 (607). Thus, packet 611 transmitted by host 5 (605) to gateway 1 (607) contains a source address: 172.19.0.5 and a destination address: 10.2.0.6.

When packet 611 arrives at gateway 1 (607), gateway 1 (607) transforms it into packet 612. To obtain the source and destination address to insert into packet 612, gateway 1 (607) creates a request to send to address mapper 603 for the system address of the source (i.e., host 5 (605)) and the system address of the destination (i.e., host 6 (606)). Specifically, a packet processing unit (similar to packet processing unit 353 in FIG. 3), not depicted, of gateway 1 (607) creates the request to send to address mapper 603.

Address mapper 603 receives the request. Specifically, an access point (similar to access point 1 (361) depicted in FIG. 3), not depicted, of an address mapping engine (similar to address mapping engine 364 depicted in FIG. 3), not depicted, of address mapper 603 (in FIG. 6A) receives the request and the address mapping engine produces the system address based on information from the gateway, the query interceptor, and information stored in the database 663. Database 663 is a type of storage database that stores mappings of system addresses (i.e., native addresses and reference values) to native addresses (such as IP addresses) or translated native addresses.

The access point of address mapping engine, not depicted, of address mapper 603 transmits system addresses of the hosts to gateway 1 (607). Address mapper 603 provides to gateway 1 (607) host 5 (605)'s system address: 11.0.0.1+155 and host 6 (606)'s system address: 22.0.0.2+266.

In an implementation, address mapper 603 may provide the address of the hosts in a manner similar to the ones described above with respect to FIGS. 4, 5A, and 5B. Gateway 1 (607) may then transmit packet 612 to gateway 2 (608) (via network 660). Thus, packet 612 transmitted by gateway 1 (607) contains a source address: 11.0.0.1+155 and a destination address: 22.0.0.2+266.

After transmission over network 660, packet 612 arrives at gateway 2 (608). Gateway 2 (608) then creates a packet 613 which includes a source and destination address. To obtain the source and destination address to insert into packet 613, gateway 2 (608) creates a request to send to address mapper 604 for a translated native address of the source and a native address of the destination (i.e., host 6 (606)). Specifically, a packet processing unit (similar to packet processing unit 353 in FIG. 3), not depicted, of gateway 2 (608) creates the request to send to address mapper 604.

Address mapper 604 receives the request. Specifically, an access point (similar to access point 1 (361) depicted in FIG. 3), not depicted, of an address mapping engine (similar to address mapping engine 364 depicted in FIG. 3), not depicted, of address mapper 604 (in FIG. 6A) receives the request and the address mapping engine generates the translated native address based on information from gateway 608 DNS query interceptor 666, and information stored in database 664. The address mapper engine returns the native address of the destination based on information from gateway 608, DNS query interceptor 666, and information stored in database 664. Database 664 is a type of storage database that stores mappings of system addresses (i.e., native addresses and reference values), native addresses (such as IP addresses) and/or translated native addresses.

The access point of address mapping engine, not depicted, of address mapper 604 transmits the native address of host 6 (606) and the translated native address of host 5 (605) as follows: 10.1.0.5 and 172.24.0.6, respectively, to gateway 2 (608).

Packet 613 arrives at host 6 (606) and no further changes to addresses are made. Thus, an application running on host 6 (606) receives packet 614 containing a source address: 10.1.0.5 and a destination address: 172.24.0.6.

When host 6 (606) wishes to transmit a response to the packet to host 5 (605), host 6 (606) creates a packet 615. The application running on host 6 (606) flips or inverts the source address and the destination address contained in packet 614. Thus, host 6 (606) inserts its own native address: 172.24.0.6 into a source address portion of the header and the translated native address of the destination (10.1.0.5) into a destination address portion of the header. Host 6 (606) may then transmit the packet to gateway 2 (608). Thus, packet 615 transmitted by host 6 (606) to gateway 2 (608) contains a source address: 172.24.0.6 and a destination address: 10.1.0.5.

In another implementation, if host 6 (606) does not obtain the addresses from packet 614, host 6 (606) may obtain the destination's address from DNS query interceptor 666 in a manner similar to the one described above in relation to packet 611.

When packet 615 arrives at gateway 2 (608), gateway 2 (608) transforms it into packet 616. To obtain the source and destination address to insert into packet 616, gateway 2 (608) creates a request to send to address mapper 604 for the system address of the source (i.e., host 6 (606)) and the system address of the destination (i.e., host 5 (605)). Specifically, a packet processing unit (similar to packet processing unit 353 in FIG. 3), not depicted, of gateway 2 (608) creates the request to send to address mapper 604.

Address mapper 604 receives the request. Specifically, an access point (similar to access point 1 (361) depicted in FIG. 3), not depicted, of an address mapping engine (similar to address mapping engine 364 depicted in FIG. 3), not depicted, of address mapper 604 (in FIG. 6A) receives the request and the address mapping engine turns the native address and generates the translated native address based on information from gateway 2 (608), DNS query interceptor 666, and information stored in the database 664. Database 664 is a type of storage database that stores mappings of system addresses (i.e., native addresses and reference values) to native addresses (such as IP addresses) or translated native addresses.

The access point of address mapping engine, not depicted, of address mapper 604 transmits system addresses of the hosts to gateway 2 (608). Address mapper 604, provides to gateway 2 (608), host 5 (605)'s system address: 11.0.0.1+155 and host 6 (606)'s system address: 22.0.0.2+266.

In an implementation, address mapper 604 may provide the address of the hosts in a manner similar to the ones described above with respect to FIGS. 4, 5A, and 5B and packet 612. Gateway 2 (608) may then transmit packet 616 to gateway 1 (607) (via network 660). Thus, packet 616 transmitted by gateway 2 (608) contains a source address: 22.0.0.2+266 and a destination address: 11.0.0.1+155.

After transmission over network 660, packet 616 arrives at gateway 1 (607). Gateway 1 (607) then creates a packet 617 which includes a source and destination address. To obtain the source and the destination address to insert into packet 617, gateway 1 (607) creates a request to send to address mapper 603 for the translated native address of the source and a native address of the destination (i.e., host 5 (605)). Specifically, a packet processing unit (similar to packet processing unit 353 in FIG. 3), not depicted, of gateway 1 (607) creates the request to send to address mapper 603. Address mapper 603 receives the request. Specifically, an access point (similar to access point 1 (361) depicted in FIG. 3), not depicted, of an address mapping engine (similar to address mapping engine 364 depicted in FIG. 3), not depicted, of address mapper 603 (in FIG. 6A) receives the request and the address mapping engine returns the native address and generates the translated native address based on information from gateway 1 (607), DNS query interceptor 665, and information stored in the database 663. Database 663 is a type of storage database that stores mappings of system addresses i.e., native addresses and reference values), native addresses (such as IP addresses) and/or translated native addresses.

The access point of address mapping engine, not depicted, of address mapper 603 transmits the native address of host 5 (605) and translated native address of host 6 (606) to gateway 1 (607). Address mapper 603, provides to gateway 1 (607), the source's translated native address: 10.2.0.6 and host 5 (605)'s native address: 172.19.0.5.

Packet 617 arrives at host 5 (605) and no further changes to addresses are made to packet 618. Thus, an application running on host 5 (605) receives packet containing a source address: 10.2.0.6 and a destination address: 172.19.0.5.

FIGS. 5A, 5B, 6A, and 6B describe systems and related packet flows of homogenous components which can interpret the same address system (e.g., IPv4). FIG. 6C illustrates packet flow 690 in a mixed networking system. Networks within the mixed networking system may use various network protocols. For example, one private network within a mixed networking system may use an IPv4 network protocol and another private network may use an IPv6 network protocol. A mixed networking system may encompass similar components and networks as the network depicted in FIG. 6A. Therefore, FIG. 6C is described with reference to FIG. 6A. However, note that the addresses of components depicted in FIG. 6A do not apply to the components described in participating in packet flow 690 in FIG. 6C. The components depicted in FIG. 6A may be compatible with one networking system (e.g., IPv4) while the components utilized by FIG. 6C are compatible with mixed networks.

Figure 6C:
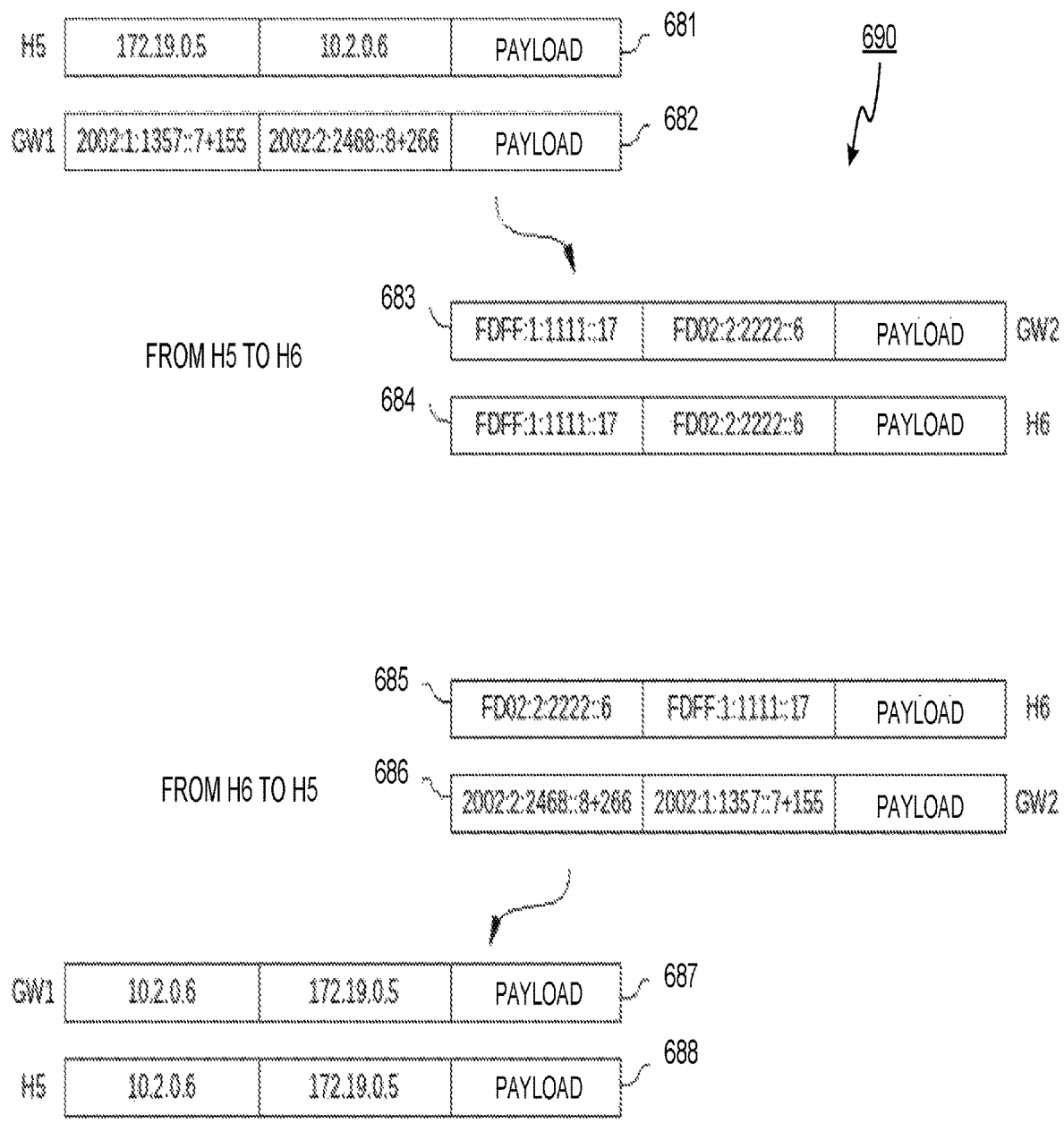
FIG. 6C illustrates packet flow in a mixed networking system, in accordance with an implementation of the disclosure.

The packet flow of FIG. 6C is similar to the packet flow described above with respect to FIGS. 5B and 6B. Referring now to FIG. 6A, network 660 may use an IPv6 address system, local network 1 may use an IPv4 address system, and local area network 2 may use an IPv6 address system. The top portion of FIG. 6C illustrates packet header details with respect to transmission of a packet from host 5 (605) (depicted in FIG. 6A) to host 6 (606) (depicted in FIG. 6A). The bottom portion of FIG. 6C illustrates packet header details with respect to transmission of a packet from host 6 (606) to host 5 (605). Suppose that host 5 (605) wishes to transmit a packet (or multiple packets) to host 6 (606).

FIGS. 6A and 6C are referred to herein below. Suppose that an application such as a software application running on host 5 (605) wishes to transmit a packet 681 to host 6 (606). Packet 681, originating from host 5 (605), includes a packet header and payload. Host 5 (605) creates packet 681 by inserting its own native address (i.e., a local IP address): (172.19.0.5) into source address portion of the header and an address of host 6 (606) into a destination address portion of the header.

To obtain the address of host 6 (606), host 5 (605) transmits a query to DNS query interceptor 665. DNS query interceptor 665 then transmits a request to DNS to obtain an address associated with host 6 (606). The address may be in a form of a system address or a different address. Suppose that the address of host 6 (606) stored within (or otherwise obtained by) DNS 600 is a system address. DNS 600 may transmit the system address (which is in a form of an IPv6 address and a reference: 2002:2:2468::8+266 to DNS query interceptor 665. As described above with respect to FIG. 2, a system address includes a native address (in the example of the address of host 6 (606), the native address is in the form of an IPv6 address) and a reference. In an implementation, DNS 600 stores (or otherwise accesses and provides) the system address of host 6 (606) as a native address of host 6 (606)'s gateway in IPv6, gateway 2 (608), along with reference value of 266.

DNS query interceptor 665, after recognizing that the address associated with host 6 (606) is a system address, transmits the system address to address mapper 603. Address mapper 603 maps the system address of host 6 (606) to a translated native address: 10.2.0.6. In an implementation, address mapper 603 may generate the translated native address associated with host 6 (606) based on information from gateway 1 (607), DNS query interceptor 665, and information stored in the database 663 (or another database).

Address mapper 603 then transmits the translated native address of host 6 (606) to DNS query interceptor 665, and DNS query interceptor 665 transmits the translated native address of host 6 (606) to host 5 (605) and an application running on host 5 (605) creates packet 681 (as depicted by FIG. 6C). Host 5 (605) transmits packet 681 to gateway 1 (607). Thus, packet 681 transmitted by host 5 (605) to gateway 1 (607) contains a source address: 172.19.0.5 and a destination address: 10.2.0.6.

When packet 681 arrives at gateway 1 (607), gateway 1 (607) transforms it into packet 682. To obtain the source and destination address to insert into packet 612, gateway 1 (607) creates a request to send to address mapper 603 for the system address of the source (i.e., host 5 (605)) and the system address of the destination (i.e., host 6 (606)). Specifically, a packet processing unit (similar to packet processing unit 353 in FIG. 3), not depicted, of gateway 1 (607), may identify or otherwise recognize differences between address formats and network types. A network may be a type of IPv4 or IPv6 network, for example. In one example, a packet processing unit may identify that local network 1 is an IPv4 network compatible with IPv4 addresses and network 660 is an IPv6 network. A packet processing unit may create a request for system addresses to address mapper 603.

Address mapper 603 receives the request. Specifically, an access point (similar to access point 1 (361) depicted in FIG. 3), not depicted, of an address mapping engine (similar to address mapping engine 364 depicted in FIG. 3), not depicted, of address mapper 603 (in FIG. 6A) receives the request and the address mapping engine generates the translated native address based on information from gateway 607, DNS query interceptor 665, and information stored in the database 663. Database 663 is a type of storage database that stores mappings of system addresses (i.e., native addresses and reference values) to native addresses (such as IP addresses) or translated native addresses.

The access point of address mapping engine, not depicted, of address mapper 603 transmits system addresses of the hosts to gateway 1 (607). Address mapper 603 provides to gateway 1 (607) host 5 (605)'s system address: 2002:1: 1357::7+155 and host 6 (606)'s system address: 2002:2: 2468::8+266.

In an implementation, address mapper 603 may provide the address of the hosts in a manner similar to the ones described above with respect to FIGS. 4, 5A, and 5B. Gateway 1 (607) recognizes that it must send the packets on a different network and prepares a suitable new packet, in this case an IPv6 packet. Gateway 1 (607) sets source and destination system addresses and copies the payload to the packet. Gateway 1 (607) may then transmit packet 682 to gateway 2 (608) (via network 660). Thus, packet 682 transmitted by gateway 1 (607) contains a source address: 2002:1:1357::7+155 and a destination address: 2002:2: 2468::8+266.

After transmission over network 660, packet 682 arrives at gateway 2 (608). Gateway 2 (608) then creates a packet 683 which includes a source and destination address. To obtain the source and destination address to insert into packet 683, gateway 2 (608) creates a request to send to address mapper 604 for a translated native address of the source and a native address of the destination (i.e., host 6 (606)). Specifically, a packet processing unit (similar to packet processing unit 353 in FIG. 3), not depicted, of gateway 2 (608) creates the request to send to address mapper 604.

Address mapper 604 receives the request. Specifically, an access point (similar to access point 1 (361) depicted in FIG. 3), not depicted, of an address mapping engine (similar to address mapping engine 364 depicted in FIG. 3), not depicted, of address mapper 604 (in FIG. 6A) receives the request and the address mapping engine returns the native address and generates the mapped based on information from gateway 2 (608), DNS query interceptor 666, and information stored in the database 664. Database 664 is a type of storage database that stores mappings of system addresses (i.e., native addresses and reference values), native addresses (such as IP addresses) and/or translated native addresses.

The access point of address mapping engine, not depicted, of address mapper 604 transmits the native address of host 6 (606) and translated native address of host 5 (605) to gateway 2 (608). Address mapper 604, provides to gateway 2 (608), the source's translated native address: FDFF:1:1111::17 and host 6 (606)'s native address: FD02:2:2222::6.

Packet 683 arrives at host 6 (606) and no further changes to addresses are made. Thus, an application running on host 6 (606) receives packet 684 containing a source address: FDFF:1:1111::17 and a destination address: FD02:2:2222::6.

When host 6 (606) wishes to transmit a response to the packet to host 5 (605), host 6 (606) creates a packet 685. The application running on host 6 (606) flips or inverts the source address and the destination address contained in packet 614. Thus, host 6 (606) inserts its own native address: FD02:2:2222::6 into a source address portion of the header and the native address of the destination (FDFF:1:1111::17) into a destination address portion of the header. Host 6 (606) may then transmit the packet to gateway 2 (608). Thus, packet 685 transmitted by host 6 (606) to gateway 2 (608) contains a source address: FD02:2:2222::6 and a destination address: FDFF:1:1111::17.

In another implementation, if host 6 (606) does not obtain the addresses from packet 614, host 6 (606) may obtain the destination's address from DNS query interceptor 666 in a manner similar to the one described above in relation to packet 681.

When packet 685 arrives at gateway 2 (608), gateway 2 (608) transforms it into packet 686. To obtain the source and destination address to insert into packet 686, gateway 2 (608) creates a request to send to address mapper 604 for the system address of the source (i.e., host 6 (606)) and the system address of the destination (i.e., host 5 (605)). Specifically, a packet processing unit (similar to packet processing unit 353 in FIG. 3), not depicted, of gateway 2 (608) creates the request to send to address mapper 604.

Address mapper 604 receives the request. Specifically, an access point (similar to access point 1 (361) depicted in FIG. 3), not depicted, of an address mapping engine (similar to address mapping engine 364 depicted in FIG. 3), not depicted, of address mapper 604 (in FIG. 6A) receives the request and the address mapping engine generates the system addresses based on information from gateway 2 (608), DNS query interceptor 666, and information stored in the database 664. Database 664 is a type of storage database that stores mappings of system addresses (i.e., native addresses and reference values) to native addresses (such as IP addresses) or translated native addresses.

The access point of address mapping engine, not depicted, of address mapper 604 transmits system addresses of the hosts to gateway 2 (608). Address mapper 604, provides to gateway 2 (608), the destination's system address: 2002:1:1357::7+155 and host 6 (606)'s system address: 2002:2:2468::8+266.

In an implementation, address mapper 604 may provide the address of the hosts in a manner similar to the ones described above with respect to FIGS. 4, 5A, and 5B and packet 682. Gateway 2 (608) may then transmit packet 686 to gateway 1 (607) (via network 660). Thus, packet 616 transmitted by gateway 2 (608) contains a source address: 2002:2:2468::8+266 and a destination address: 2002:1:1357::7+155.

After transmission over network 660, packet 686 arrives at gateway 1 (607). Gateway 1 (607) then creates a packet 687 which includes a source and destination address. To obtain the source and destination address to insert into packet 687, gateway 1 (607) creates a request to send to address mapper 603 for a translated native address of the source and a native address of the destination (i.e., host 5 (605)). Specifically, a packet processing unit (similar to packet processing unit 353 in FIG. 3), not depicted, of gateway 1 (607), may identify or otherwise recognizes differences between address formats and network types. Address mapper 603 receives the request. Specifically, an access point (similar to access point 1 (361) depicted in FIG. 3), not depicted, of an address mapping engine (similar to address mapping engine 364 depicted in FIG. 3), not depicted, of address mapper 603 (in FIG. 6A) receives the request and the address mapping engine returns the native address and generates the translated native address based on information from gateway 1 (607), DNS query interceptor 665, and information stored in the database 663. Database 663 is a type of storage database that stores mappings of system addresses (i.e., native addresses and reference values), native addresses (such as IP addresses) and/or translated native addresses.

The access point of address mapping engine, not depicted, of address mapper 603 transmits the native address of host 5 (605) and the translated native address of the source to gateway 1 (607). Address mapper 603, provides to gateway 1 (607), the source's translated native address: 10.2.0.6 and host 5 (605)'s native address: 172.19.0.5.

Gateway 1 (607) recognizes that it should send the packets on a different network than its local network and prepares a suitable new packet, in this case an IPv4 packet. Gateway 1 (607) sets source and destination system addresses and copies the payload to the packet. Gateway 1 (607) then transmits the packet to host 5 (605).

Packet 687 arrives at host 5 (605) and no further changes to addresses are made. Thus, an application running on host 5 (605) receives packet 688 containing a source address: 10.2.0.6 and a destination address: 172.19.0.5.

In an implementation, various components depicted in one or more of the figures may perform similar actions as other, similar components depicted in another one or more of the figures. Therefore, all features described with respect to any one of an address mapper, a database, a DNS query interceptor, a gateway, and a host depicted in the figures may apply to one or more of the another one of an address mapper, a database, a DNS query interceptor, a gateway, and a host, respectively depicted in another figure or figures.

Referring again to FIG. 3, suppose that host 5 (314) (also referred to as a first host) wishes to obtain a destination address of host 6 (334) (also referred to as a second host) to place in a packet that is destined for host 6 (334). In an implementation, DNS 306 may receive a request from host 5 (314) for a system address associated with a second host (i.e., host 6 (344)). The second host is not in the same private network as host 5 (314). Upon receiving request from host 5 (314), DNS 306 may return a system address. In one implementation, host 5 (314) may support system addresses in which case, no mapping may be needed. Upon receiving the system address from DNS 306, host 5 (314) may insert it as the destination address in the packet.

In one implementation, DNS query interceptor 365 may receive a request from host 5 (315) for a native address of a second host. Host 5 (314) may have network stack 317 that may not be compatible with a system address. Upon receiving the request from host 5 (314), DNS query interceptor 365 may request the naming resolution of the second host on behalf of host 5 (314) and obtain a system address, instead of a native address, from DNS 306. DNS query interceptor 365 may be in communication with DNS 306 and the address mapper 304. DNS query interceptor 365 may request address mapper 304 to map a system address into a translated native address. The address mapper may provide such mappings based on information provided by the DNS query interceptor and information stored in the database. Once DNS query interceptor 365 receives the translated native address, it may then transmit it to host 5 (315).

In an implementation, referring again to FIG. 3, an address mapping system includes address mapping engine 364 and gateway 310. Address mapping engine 364 includes multiple mappings of respective input addresses to respective output addresses. Gateway 310 includes packet processing unit 353 which is configured to communicate with address mapping engine 364 with respect to output addresses. Gateway 310 replaces an input address with an output address. The output address includes one of a native address, a translated native address or a system address. Gateway 310 replaces the input address with the output address.

In an implementation, an output address is an address that is provided by an address mapper. The output address is a mapped address and is provided to a gateway.

In an implementation, the address mapping system further includes DNS query interceptor 365 in communication with address mapping engine 364. DNS query interceptor 365 is configured to issue queries for a host native address (associated with host 6 (334)) or a host system address (associated with host 6 (334)) on behalf of host 5 (314). The queries are transmitted to DNS 306. Specifically, DNS query interceptor 365 communicates with DNS 306 to obtain the host native address or the host system address.

In an implementation, the address mapping system further includes at least one access point (e.g., access point 1 (351)) associated with packet processing unit 353. The access point provides the multiple mappings to gateway 310.

In an implementation, the address mapping system is compatible with at least one of IPv4 addresses or IPv6 addresses.

In an implementation, packet processing unit 353 is further configured to identify a difference between network types, repackage packets into different network types, apply addresses returned by address mapper 304 and copy payload.

In an implementation, gateway 310 replaces another native address in a packet with the system address, where a native address portion of the system address is inserted into a native address field of the packet, and a reference value is inserted into one of: a header of the packet or a field in a tunnel.

In an implementation, address mapping engine 364 performs address mapping based on information provided by the gateways, DNS interceptors, and information in the database. The system further includes DNS query interceptor 365, in communication with address mapping engine 364 and DNS 306. Packet processing unit 353 may be configured to request address mapping from address mapper 304 based on information it provides to address mapper 304 and on information address mapper 304 obtains from DNS query interceptor 365 and information in the database 363. Gateway 310 replaces a native associated with host 5 (314) with a system address obtained from address mapper 304 and replaces the destination address with a system address obtained from the address mapper 304. Gateway 310 communicates, using the source and destination addresses obtained from address mapper 304, over network 305.

In an implementation, packet processing unit 353 may identify a difference between network types of network stacks 391, . . . , 392. Packet processing unit 353 may repackage packets into different network types in addition to applying mapped addresses returned by address mapper 304 and copy the payload.

In an implementation, gateway 310 further include at least one access point (e.g., access point 1 (351)) associated with packet processing unit 353. The access point provides the multiple mappings to gateway 310.

In an implementation, DNS query interceptor 365 communicates with a domain name system to obtain system addresses.

In an implementation, database 363 includes information used by address mapping engines to produce address mappings. The information may include stored mappings, various parameters, configuration, and any other data used in the process.

In an implementation, wherein the address mapping system is compatible with at least one of IPv4 addresses or IPv6 addresses.

In an implementation depicted by FIGS. 6A, 6B and 6C, gateways may be capable of interpreting system addresses while hosts may not. Therefore, gateways and DNS query interceptors translate system addresses to comply or be compatible with hosts. In other implementations, when hosts may be able to interpret system addresses, it may not be necessary to map system addresses to native addresses. In such implementations, instead of a host requesting a destination address from a DNS query interceptor, the host may instead directly query a DNS instead. Therefore, the DNS query interceptor may be bypassed or the DNS query interceptor may be an optional component in such implementations. Details regarding the use or bypassing of a DNS query interceptor (also referred to as a query interceptor) are described herein with respect to FIG. 7.

Figure 7:
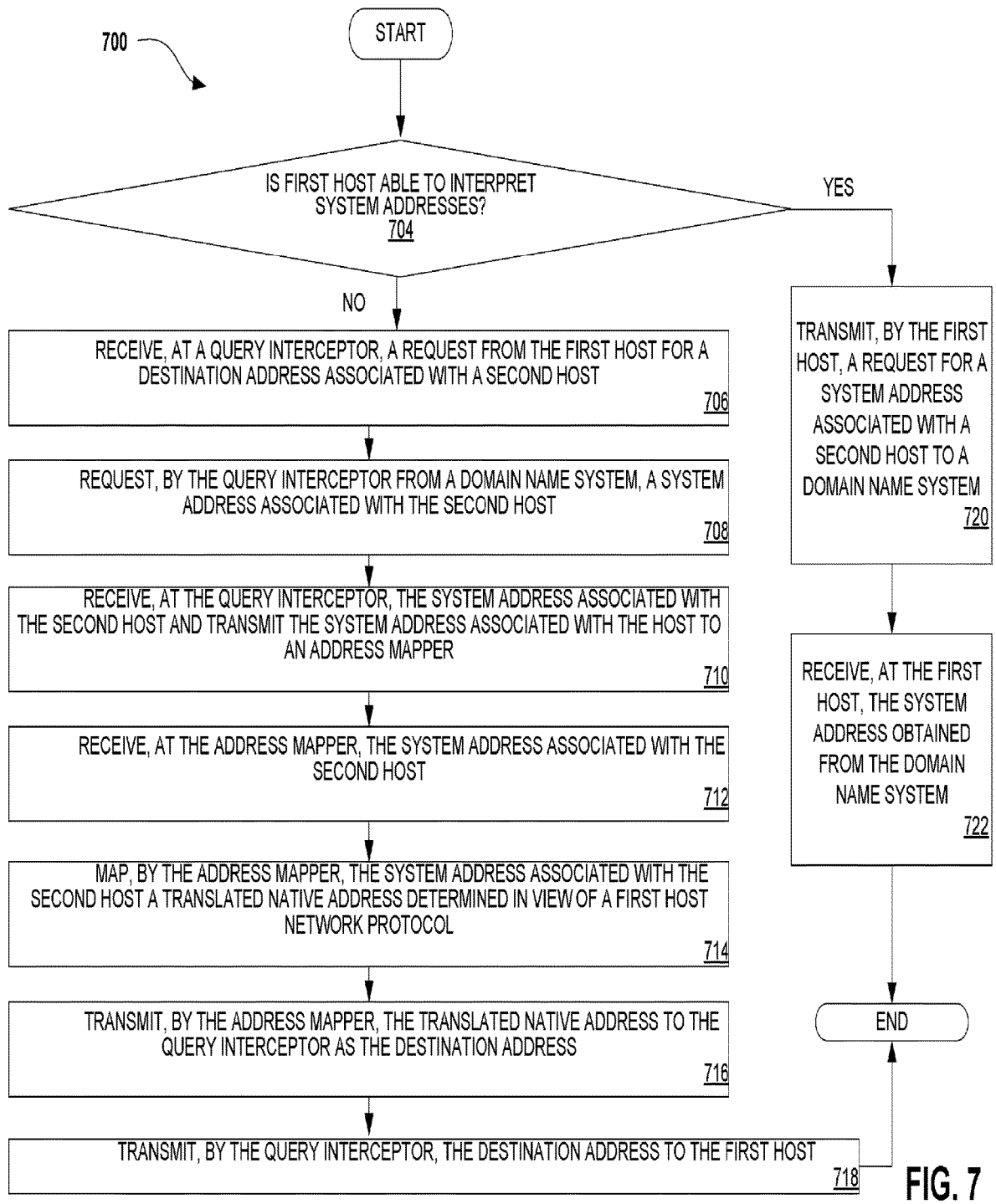
FIG. 7 is a flowchart of a method of obtaining an address of a host, in accordance with an implementation of the disclosure.

FIG. 7 is a flowchart of a method of obtaining an address of a host. In an implementation, FIG. 7 may be associated with and include the steps described above with respect to FIGS. 4A and 4B. In an implementation, examples relating to FIG. 7 are described herein with respect to FIG. 6A. At decision block 704, a determination is made whether a first host (e.g., host 5) is able to interpret system addresses. The determination may be made by the first host or another connected device, or by configuration by an administrator In response to decision block 704 returning a "no," the method continues to block 706. In block 706, a query interceptor receives a request from the first host for a native address associated with a second host. Referring to FIG. 6A, DNS query interceptor 665 receives a request from host 5 (605) for a destination address associated with host 6 (606).

Referring again to FIG. 7, in block 708, the query interceptor requests, from a domain name system, a system address associated with the second host. Referring to FIG. 6A, DNS query interceptor 665 requests, from DNS 600, a system address associated with host 6 (606).

Referring again to FIG. 7, in block 710, the query interceptor receives the system address associated with the second host and transmits the system address associated with the second host to an address mapper. Referring to FIG.

6A, DNS query interceptor 665 receives the system address of host 6 (606): 22.0.0.2+266 and transmits it to address mapper 603.

Referring again to FIG. 7, in block 712, the address mapper receives the system address associated with the second host. Referring to FIG. 6A, address mapper 603 receives the system address associated with host 6 (606).

Referring again to FIG. 7, in block 714, the address mapper maps the system address associated with the second host to the translated native address determined in view of a first host network protocol. Referring to FIG. 6A, address mapper 603 maps the system address: 22.0.0.2+266 to the translated native address: 10.2.0.6 which is determined in view of host 5 (605)'s network protocol.

Referring again to FIG. 7, in block 716, the address mapper transmits the translated native address to the query interceptor as the destination address. Referring to FIG. 6A, address mapper 603 transmits the translated native address: 10.2.0.6 to DNS query interceptor 665 as the destination address.

Referring again to FIG. 7, in block 718, the query interceptor transmits the destination address to the first host. Referring to FIG. 6A, DNS query interceptor 665 transmits the destination to host 5 (605).

The method then ends.

In response to decision block 704 returning a "yes," the method continues to block 720. In block 720, the first host transmits a request for a system address associated with a second host to a domain name system. Referring to FIG. 6A, host 5 (605) transits a request for a system address associated with host 6 (606) to domain name system 600.

Referring again to FIG. 7, in block 722, the first host receives the system address obtained from the domain name system. Referring to FIG. 6A, host 5 (605) receives the system address: 22.0.0.2+266 from DNS 600.

The method then ends.

Some lines are depicted in the figures as dashed lines and thus, these lines may be optional.

Figure 8:
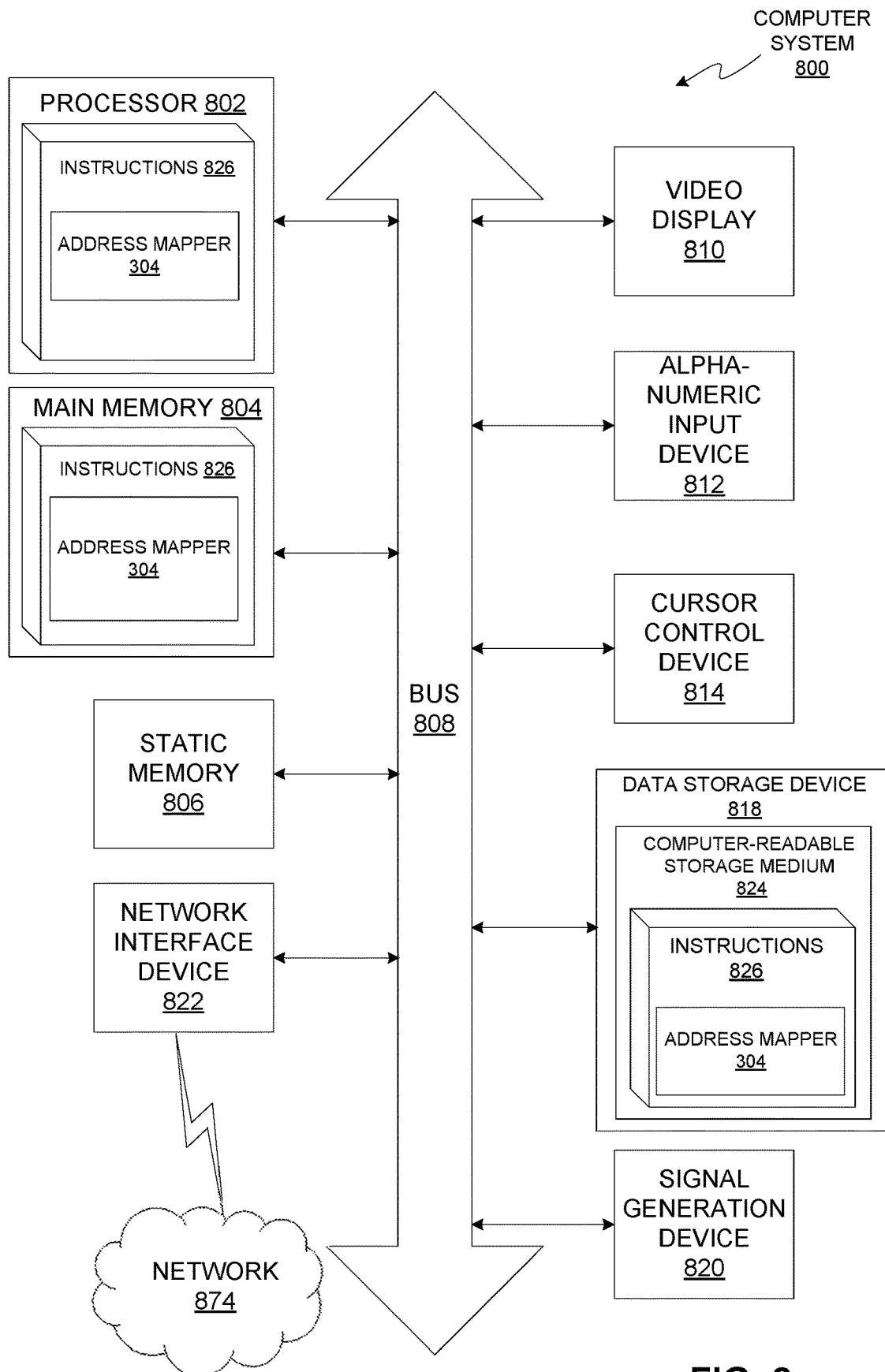
FIG. 8 illustrates a block diagram illustrating an exemplary computer device operating in accordance with an implementation of the disclosure.

FIG. 8 illustrates a block diagram of an illustrative computing device operating, in accordance with the examples of the disclosure. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random access memory (DRAM) (such as synchronous DRAM (SDRAM) or RDRAM, etc.), a static memory 806 (e.g., flash memory, static random access memory (SRAM), etc.), and a data storage device 818, which communicate with each other via a bus 808.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 826 for performing the operations and steps discussed herein.

In accordance with one or more aspects of the present disclosure, processing device 802 may be configured to execute address mapper 304 implementing methods 400, 420, and 700 for providing system addresses. Although address mapper 304 is depicted in FIG. 8, in other implementations, not depicted, address mapper 324, address mapper 513, address mapper 514, address mapper 603, address mapper 604, DNS query interceptor 365, DNS query interceptor 385, DNS query interceptor 665, and/or DNS query interceptor 666 may also be included within processing device 802 and/or non-transitory computer-readable storage medium 824.

The computer system 800 may further include a network interface device 822 communicably coupled to a network 874. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 818 may include a non-transitory computer-readable storage medium 824 on which is stored instructions 826 embodying any one or more of the methodologies of functions described herein. The instructions 826 may also reside, completely or at least partially, within the main memory 804 as instructions 826 and/or within the processing device 802 as instructions 826 during execution thereof by the computer system 800; the main memory 804 and the processing device 802 also constituting machine-accessible storage media.

In accordance with one or more aspects of the present disclosure, instructions 826 may comprise executable instructions encoding various functions of implementing methods 400, 420, and 700 for providing system addresses.

The non-transitory computer-readable storage medium 824 may also be used to store instructions 826 to implement any one or more of the methodologies of functions described herein in a computer system, such as the system described with respect to FIGS. 3, 5A, and/or 6A, and/or a software library containing methods that call the above applications.

While the non-transitory computer-readable storage medium 824 is shown in an example implementation to be a single medium, the term "non-transitory computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing, encoding or carrying a set of instruction for execution by the machine and that cause the machine to perform any one or more of the methodologies of the disclosure. The term "non-transitory computer-readable storage medium" shall accordingly be taken to include, but not be limited to, solid-state memories, and optical and magnetic media.

In the foregoing description, numerous details are set forth. It may be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "initiating", "generating", "determining", "sending", "invoking", "storing", "updating", "identifying", "presenting", "causing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems may appear as set forth in the description below. In addition, the disclosure is not described with reference to any particular programming language. It may be appreciated that a variety of programming languages may be used to implement the teachings of the disclosure as described herein.

The disclosure may be provided as a computer program product, or software, that may include a machine-readable storage medium having stored thereon instructions, which may be used to program a computer system (or other electronic devices) to perform a process according to the disclosure. A machine-readable storage medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

For purposes of this disclosure, any element mentioned in the singular also includes the plural.

Although some figures depict lines with arrows to represent intra-network or inter-network communication, in other implementations, additional arrows may be included to represent communication. Therefore, the arrows depicted by the figures do not limit the disclosure to one-directional or bi-directional communication.

Whereas many alterations and modifications of the disclosure may no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims, which in themselves recite only those features regarded as the disclosure.

What is claimed is:

1. A network communication process, comprising:
receiving from a sending host a network layer packet directed to a receiving host;
determining the receiving host the network layer packet is directed to, based on a network layer packet destination address;
determining a destination system address associated with the receiving host, wherein the destination system address comprises a native network layer address and a reference, and wherein the reference is opaque to a transport network;
inserting the destination system address into the network layer packet, wherein the native network layer address and the reference are inserted into distinct fields in the network layer packet;
sending the network layer packet on the transport network operably coupling the sending host to the receiving host;
receiving the network layer packet from the transport network;
replacing the destination system address native network layer address in the network layer packet with a receiving host native network layer address;
sending the network layer packet to the receiving host native network layer address; and
subdividing the reference into a plurality of fields associated with the receiving host, wherein the plurality of fields includes a load balance parameter.

2. The process of claim 1, wherein the process further comprises the destination system address associated with the receiving host determined in response to a determination the receiving host is not in a sending host network layer address space.

3. The process of claim 2, wherein the determination the receiving host is not in the sending host network layer address space is based on a determination the network layer packet destination address is a system address.

4. The process of claim 2, wherein the determination the receiving host is not in the sending host network layer address space is based on a determination the network layer packet destination address is a stand-in address for the destination system address.

5. The process of claim 4, wherein the process further comprises negotiating the stand-in address through a host addressable from the sending host network layer address space.

6. The process of claim 1, wherein determining the destination system address associated with the receiving host further comprises the network layer packet destination address determined to be distinct from the receiving host native network layer address.

7. The process of claim 1, wherein the process further comprises replacing the destination system address native network layer address with the receiving host native network layer address in response to determining the destination system address native network layer address is not the receiving host native network layer address.

8. The process of claim 1, wherein the sending host is addressable in a sending private network layer address space, and wherein the receiving host is addressable in a receiving private network layer address space distinct from the sending private network layer address space, and wherein the transport network provides a public address space.

9. The process of claim 1, wherein receiving from the sending host the network layer packet directed to the receiving host further comprises the network layer packet received by a sending gateway configured to provide access between the transport network and a private network layer address space in which the sending host is addressable.

10. The process of claim 9, wherein sending the network layer packet on the transport network further comprises the sending gateway sending the network layer packet.

11. The process of claim 9, wherein determining the destination system address associated with the receiving host further comprises the destination system address native network layer address is the native network layer address of a receiving gateway in the network layer address space of the transport network.

12. The process of claim 1, wherein the process further comprises replacing the destination system address native network layer address in the network layer packet with the receiving host native network layer address, in response to a determination the destination system address native network layer address is distinct from the receiving host native network layer address.

13. The process of claim 1, wherein receiving the network layer packet from the transport network further comprises the network layer packet received by a receiving gateway configured to provide access between the transport network and a private network layer address space in which the receiving host is addressable.

14. The process of claim 13, wherein the process further comprises the receiving gateway replacing the destination system address native network layer address.

15. The process of claim 13, wherein the process further comprises the receiving gateway sending the network layer packet to the receiving host native network layer address.

16. The process of claim 13, wherein the process further comprises the receiving gateway converting the receiving host system address to the receiving host native network layer address.

17. The process of claim 13, wherein the network layer packet further comprises a source system address associated with the sending host, and the process further comprises the receiving gateway converting the source system address in the network layer packet to another native network layer address within a receiving host address domain.

18. The process of claim 17, wherein the process further comprises the receiving gateway converting the source system address to another native network layer address within the receiving host address domain, wherein the converted native network layer address within the receiving host address domain is recognizable by a network layer protocol employed by the receiving host, and wherein the converted native network layer address within the receiving host address domain is not within the private network layer address space in which the receiving host is addressable.

19. The process of claim 1, wherein replacing the destination system address native network layer address in the network layer packet with the receiving host native network layer address further comprises the receiving host native network layer address determined as a function of the reference.

20. The process of claim 1, wherein replacing the destination system address native network layer address in the network layer packet with the receiving host native network layer address further comprises the receiving host native network layer address determined as a function of the destination system address.

21. The process of claim 1, wherein replacing the destination system address native network layer address in the network layer packet with the receiving host native network layer address further comprises the receiving host native network layer address determined as a function of the source system address.

22. The process of claim 1, wherein replacing the destination system address native network layer address in the network layer packet with the receiving host native network layer address further comprises the receiving host native network layer address determined as a function of receiving host configuration.

23. The process of claim 1, wherein replacing the destination system address native network layer address in the network layer packet with the receiving host native network layer address further comprises the receiving host native network layer address determined as a function of load balancing.

24. The process of claim 1, wherein replacing the destination system address native network layer address in the network layer packet with the receiving host native network layer address further comprises the receiving host native network layer address determined as a function of a connection state of a host addressable within a network layer address space in which the receiving host is addressable.

25. The process of claim 24, wherein the connection state is determined as a function of at least one of: the source system address; or, the destination system address.

26. A network communication system, comprising:
a sending network providing a network layer address space exclusive to the sending network;
a receiving network providing a network layer address space exclusive to the receiving network;
a transport network providing a network layer address space exclusive to the transport network;
a sending host addressable in the network layer address space exclusive to the sending network, the sending host comprising:
a first processor, operably coupled with the sending network; and,
a first memory, operably coupled with the first processor, wherein the first memory encodes processor executable program instructions and data to program and configure the first processor to cause the sending host to perform operations comprising:
  send a network layer packet on the sending network;
a sending gateway configured to provide access between the transport network and the network layer address space in which the sending host is addressable, the sending gateway comprising:
  a second processor, operably coupled with the sending network and the transport network; and,
  a second memory, operably coupled with the second processor, wherein the second memory encodes processor executable program instructions and data to program and configure the second processor to cause the sending gateway to perform operations comprising:
    receive from the sending network the network layer packet sent from the sending host;
    determine a source system address associated with the sending host, wherein the source system address comprises a sending host native network layer address and a first reference, and wherein the first reference is opaque to the transport network;
    insert the source system address into the network layer packet, wherein the sending host native network layer address and the reference are inserted into distinct fields in the network layer packet;
    determine the destination the network layer packet is directed to, based on a network layer packet destination address;
    determine a destination system address associated with the destination, wherein the destination system address comprises a destination native network layer address and a second reference, and wherein the second reference is opaque to the transport network;
    insert the destination system address into the network layer packet, wherein the destination native network layer address and the second reference are inserted into distinct fields in the network layer packet; and,
    send the network layer packet on the transport network;
a receiving gateway configured to provide access between the transport network and the network layer address space exclusive to the receiving network, the receiving gateway comprising:
  a third processor, operably coupled with the transport network and the receiving network; and,
  a third memory, operably coupled with the third processor, wherein the third memory encodes processor executable program instructions and data to program and configure the third processor to cause the receiving gateway to perform operations comprising:
    receive from the transport network the network layer packet sent from the sending gateway;
    replace the destination system address native network layer address in the network layer packet with the destination native network layer address, wherein the destination native network layer address is determined as a function of the destination system address and the connection state of a receiving host addressable within the receiving network address space;
    convert the source system address in the network layer packet to a native network layer address within the receiving host address domain, and replace the network layer packet source native network layer address with the converted native network layer address; and,
    send on the receiving network the network layer packet to the destination native network layer address; and,
a receiving host addressable at the destination native network layer address in the network layer address space exclusive to the receiving network, the receiving host comprising:
  a fourth processor, operably coupled with the receiving network; and,
  a fourth memory, operably coupled with the fourth processor, wherein the fourth memory encodes processor executable program instructions and data to program and configure the fourth processor to cause the receiving host to perform operations comprising:
    receive from the receiving network the network layer packet sent from the receiving gateway;
  wherein the first reference is unique to the sending network and the second reference is unique to the receiving network when the first reference is the same as the second reference; and
  wherein the network layer packet excludes public address information when the network layer packet includes the converted native network layer address.

27. The system of claim 26, wherein the network layer address space exclusive to the sending network is a private network layer address space.

28. The system of claim 26, wherein the network layer address space exclusive to the receiving network is a private network layer address space.

29. The system of claim 26, wherein the network layer address space exclusive to the transport network is a public network layer address space.

30. The system of claim 26, wherein the apparatus further comprises the first reference determined by the sending gateway as a function of a mapping associating the sending host native network layer address to the first reference.

31. The system of claim 30, wherein the mapping associating the network layer address to the first reference is private to the sending gateway.

32. The system of claim 30, wherein the mapping associating the network layer address to the first reference is shared between the sending gateway and the receiving gateway.

33. The system of claim 26, wherein the system further comprises the destination native network layer address determined by the receiving gateway as a function of the second reference and a mapping associating the destination native network layer address to the second reference.

34. The system of claim 33, wherein the mapping associating the destination native network layer address to the second reference is private to the receiving gateway.

35. The system of claim 33, wherein the mapping associating the destination native network layer address to the second reference is shared between the sending gateway and the receiving gateway.

36. The system of claim 26, wherein the transport network further comprises the Internet.

37. The system of claim 26, wherein each of the first reference and the second reference is divided into a plurality of reference fields, and wherein at least one reference field of the plurality of reference fields is used for determination of the destination native network layer address or the sending host native network layer address.

38. The system of claim 37, wherein the at least one reference field used for determination of the destination native network layer address or the sending host native network layer address encodes a host identification number.

39. A network communication system, comprising:
a sending network providing a private network layer address space exclusive to the sending network;
a receiving network providing a private network layer address space exclusive to the receiving network;
a transport network providing a public network layer address space exclusive to the transport network;
a sending host addressable in the private network layer address space exclusive to the sending network, the sending host comprising:
    a first processor, operably coupled with the sending network; and,
    a first memory, operably coupled with the first processor, wherein the first memory encodes processor executable program instructions and data to program and configure the first processor to cause the sending host to perform operations comprising:
        send a network layer packet on the sending network;
a sending gateway configured to provide access between the transport network and a network layer address space in which the sending host is addressable, the sending gateway comprising:
    a second processor, operably coupled with the sending network and the transport network; and,
    a second memory, operably coupled with the second processor, wherein the second memory encodes processor executable program instructions and data to program and configure the second processor to cause the sending gateway to perform operations comprising:
        receive from the sending network the network layer packet sent from the sending host;
        determine a source system address associated with the sending host, wherein the system address comprises a sending host native network layer address and a first reference, and wherein the first reference is opaque to the transport network;
        insert the source system address into the network layer packet, wherein the sending host native network layer address and the reference are inserted into distinct fields in the network layer packet;
        determine a destination the network layer packet is directed to, based on a network layer packet destination address;
        determine a destination system address associated with the destination, wherein the destination system address comprises a destination native network layer address and a second reference, and wherein the second reference is opaque to the transport network, and wherein the destination system address is determined in response to a determination the destination is not in a sending host network layer address space;
        insert the destination system address into the network layer packet, wherein the destination native network layer address and the second reference are inserted into distinct fields in the network layer packet; and,
        send the network layer packet on the transport network;
a receiving gateway configured to provide access between the transport network and the private network layer address space exclusive to the receiving network, the receiving gateway comprising:
    a third processor, operably coupled with the transport network and the receiving network; and,
    a third memory, operably coupled with the third processor, wherein the third memory encodes processor executable program instructions and data to program and configure the third processor to cause the receiving gateway to perform operations comprising:
        receive from the transport network the network layer packet sent from the sending gateway;
        replace the destination system address native network layer address in the network layer packet with the destination native network layer address, wherein the destination native network layer address is determined as a function of the destination system address, the connection state of a receiving host addressable within the receiving network address space, and the configuration of a host addressable within the receiving network address space, and wherein the destination system address native network layer address is replaced in response to determining the destination system address native network layer address is not the destination native network layer address; and,
        send on the receiving network the network layer packet to the destination native network layer address; and,
a receiving host addressable at the destination native network layer address in the private network layer address space exclusive to the receiving network, the receiving host comprising:
    a fourth processor, operably coupled with the receiving network; and,
    a fourth memory, operably coupled with the fourth processor, wherein the fourth memory encodes processor executable program instructions and data to program and configure the fourth processor to cause the receiving host to perform operations comprising:
        receive from the receiving network the network layer packet sent from the receiving gateway;
    wherein each of the first reference and the second reference is subdivided into a plurality of fields associated with the receiving host, wherein the plurality of fields includes a load balance parameter.

40. The system of claim 39, wherein the apparatus further comprises the first reference determined by the sending gateway as a function of a mapping associating the sending host native network layer address to the first reference.

41. The system of claim 40, wherein the mapping associating the network layer address to the first reference is private to the sending gateway.

42. The system of claim 40, wherein the mapping associating the network layer address to the first reference is shared between the sending gateway and the receiving gateway.

43. The system of claim 39, wherein the system further comprises the destination native network layer address determined by the receiving gateway as a function of the second reference and a mapping associating the destination native network layer address to the second reference.

44. The system of claim 43, wherein the mapping associating the network layer address to the second reference is private to the receiving gateway.

45. The system of claim 43, wherein the mapping associating the network layer address to the second reference is shared between the sending gateway and the receiving gateway.

46. The system of claim 39, wherein the transport network further comprises the Internet.

47. The system of claim 39, wherein each of the first reference and the second reference is divided into the plurality of fields, and wherein at least one field of the plurality of fields is used for determination of the destination native network layer address or the sending host native network layer address.

48. The system of claim 47, wherein the at least one field used for determination of the destination native network layer address or the sending host native network layer address encodes a host identification number.

* * * * *